US012757019B2

(12) United States Patent
Orsino et al.

(10) Patent No.: US 12,757,019 B2
(45) Date of Patent: Oct. 6, 2026

(54) BACKWARD COMPATIBILITY HANDLING WHEN ADDING NEW INTEGRITY PROTECTION AND CIPHERING ALGORITHMS

(71) Applicant: Telefonaktiebolaget LM Ericsson (publ), Stockholm (SE)

(72) Inventors: Antonino Orsino, Kirkkonummi (FI); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 151 days.

(21) Appl. No.: 18/693,215

(22) PCT Filed: Sep. 19, 2022

(86) PCT No.: PCT/SE2022/050819
§ 371 (c)(1),
(2) Date: Mar. 19, 2024

(87) PCT Pub. No.: WO2023/043362
PCT Pub. Date: Mar. 23, 2023

(65) Prior Publication Data

US 2024/0388908 A1 Nov. 21, 2024

Related U.S. Application Data

(60) Provisional application No. 63/246,060, filed on Sep. 20, 2021.

(51) Int. Cl.

| | |
|---|---|
| ***H04W 12/08*** | (2021.01) |
| ***H04W 76/19*** | (2018.01) |
| ***H04W 76/27*** | (2018.01) |

(52) U.S. Cl.
CPC .......... *H04W 12/08* (2013.01); *H04W 76/19* (2018.02); *H04W 76/27* (2018.02)

(58) Field of Classification Search
CPC ..... H04W 12/08; H04W 76/19; H04W 76/27; H04W 76/16; H04W 76/34
See application file for complete search history.

(56) References Cited

U.S. PATENT DOCUMENTS

| | | | | |
|---|---|---|---|---|
| 9,420,487 | B2 * | 8/2016 | Jung | H04L 5/0048 |
| 10,555,168 | B2 * | 2/2020 | Mildh | H04W 12/10 |

(Continued)

FOREIGN PATENT DOCUMENTS

| | | | |
|---|---|---|---|
| WO | 2019074297 | A1 | 4/2019 |
| WO | 2019097331 | A1 | 5/2019 |
| WO | 2020064387 | A1 | 4/2020 |

OTHER PUBLICATIONS

International Search Report and Written Opinion of the International Searching Authority, PCT/SE2022/050819, mailed Dec. 1, 2022, 9 pages.

(Continued)

*Primary Examiner* — Jimmy H Tran
(74) *Attorney, Agent, or Firm* — Sage Patent Group

(57) ABSTRACT

A method performed by a communication device configured with a packet data convergence protocol, PDCP, security algorithm associated with a first radio access technology, RAT, includes responsive to the communication device being configured with a first PDCP security algorithm in the first RAT that does not have an equivalent security algorithm in a second RAT, determining a second security algorithm to use when performing radio resource control, RRC, reestablishment with the second RAT. The method includes using the second security algorithm when performing RRC reestablishment with the second RAT.

10 Claims, 9 Drawing Sheets

(56) References Cited

U.S. PATENT DOCUMENTS

| | | | | |
|---|---|---|---|---|
| 11,343,789 | B2 * | 5/2022 | Sharma | H04W 12/037 |
| 2011/0117905 | A1 * | 5/2011 | Huang | H04W 76/19<br>455/422.1 |
| 2013/0148490 | A1 * | 6/2013 | Yi | H04W 76/19<br>370/216 |
| 2014/0051447 | A1 * | 2/2014 | Li | H04W 36/0064<br>455/437 |
| 2015/0146561 | A1 * | 5/2015 | Jung | H04B 7/024<br>370/252 |
| 2016/0316404 | A1 * | 10/2016 | Sheik | H04W 48/20 |
| 2019/0037635 | A1 * | 1/2019 | Guo | H04W 76/27 |
| 2019/0150037 | A1 * | 5/2019 | Mildh | H04W 36/0005<br>370/331 |
| 2019/0297502 | A1 * | 9/2019 | Jo | H04W 88/023 |
| 2019/0356536 | A1 * | 11/2019 | Lee | H04L 41/0816 |
| 2020/0008113 | A1 * | 1/2020 | Chen | H04W 36/0085 |
| 2020/0162897 | A1 * | 5/2020 | Mildh | H04W 12/10 |
| 2020/0170069 | A1 * | 5/2020 | Shih | H04W 76/27 |
| 2020/0214070 | A1 * | 7/2020 | Ingale | H04W 12/106 |
| 2020/0229259 | A1 * | 7/2020 | Teyeb | H04W 76/19 |
| 2020/0245393 | A1 * | 7/2020 | Teyeb | H04W 76/25 |
| 2021/0014923 | A1 * | 1/2021 | Palat | H04W 76/19 |
| 2021/0136584 | A1 * | 5/2021 | Byun | H04W 12/106 |
| 2021/0136855 | A1 * | 5/2021 | Shih | H04W 76/19 |
| 2021/0153282 | A1 * | 5/2021 | Jo | H04W 76/18 |
| 2021/0360730 | A1 * | 11/2021 | Kim | H04W 76/27 |
| 2021/0399786 | A1 * | 12/2021 | Agiwal | H04M 3/537 |
| 2022/0046421 | A1 * | 2/2022 | Shrestha | H04W 12/106 |
| 2022/0174758 | A1 * | 6/2022 | Pan | H04W 76/19 |
| 2022/0225460 | A1 * | 7/2022 | Shrestha | H04W 76/19 |
| 2022/0256346 | A1 * | 8/2022 | Hori | H04W 12/106 |
| 2022/0279345 | A1 * | 9/2022 | Kim | H04W 12/106 |
| 2022/0279586 | A1 * | 9/2022 | Tsuboi | H04W 36/1443 |
| 2022/0322139 | A1 * | 10/2022 | Hori | H04L 9/0891 |
| 2022/0345970 | A1 * | 10/2022 | Kim | H04W 76/10 |
| 2023/0120096 | A1 * | 4/2023 | Kim | H04L 69/28<br>370/329 |
| 2023/0122928 | A1 * | 4/2023 | Talebi Fard | H04W 72/27<br>370/329 |
| 2023/0276233 | A1 * | 8/2023 | Basu | H04W 76/25 |

OTHER PUBLICATIONS

3GPP TS 36.331 V16.5.0 (Jun. 2021); 3rd Generation Partnership Project; Technical Specification Group Radio Access Network; Evolved Universal Radio Access Network; Evolved Universal Terrestrial Radio Access (E-UTRA); Radio Resource Control (RRC); Protocol specification (Release 16), 1091 pages.

* cited by examiner

BACKWARD COMPATIBILITY HANDLING WHEN ADDING NEW INTEGRITY PROTECTION AND CIPHERING ALGORITHMS

CROSS REFERENCE TO RELATED APPLICATIONS

This application is a 35 U.S.C. § 371 national stage application of PCT International Application No. PCT/SE2022/050819 filed on Sep. 19, 2022, which in turn claims domestic priority to U.S. Provisional Patent Application No. 63/246,060, filed on Sep. 20, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

3GPP (3rd Generation Partnership Project) Dual Connectivity

In 3GPP Rel-12, the LTE (Long Term Evolution) feature Dual Connectivity (DC) was introduced, to enable the user equipment (UE) to be connected in two cell groups, each controlled by an LTE access node, eNB (EUTRAN (evolved UMTS (universal mobile telecommunications system) base station), labelled as the Master eNB (MeNB) and the Secondary eNB (SeNB). The UE still only has one radio resource control (RRC) connection with the network. In 3GPP, the DC solution has since then been evolved and is now also specified for new radio (NR) as well as between LTE and NR. With introduction of 5G, the term MR-DC (Multi-RAT (radio access technology) Dual Connectivity), see also 3GPP TS 37.340) was defined as a generic term for all dual connectivity options which includes at least one NR access node. Using the MR-DC generalized terminology, the UE is connected in a Master Cell Group (MCG), controlled by the Master Node (MN), and in a Secondary Cell Group (SCG) controlled by a Secondary Node (SN).

Further, in MR-DC, when dual connectivity is configured for the UE, within each of the two cell groups, MCG and SCG, carrier aggregation may be used as well. In this case, within the MCG controlled by the MN, the UE may use one PCell (primary cell) and one or more secondary cell(s) (SCell(s)). And within the SCG controlled by the SN, the UE may use one Primary SCell (PSCell, also known as the primary SCG cell in NR) and one or more SCell(s). This combined case is illustrated in FIG. 1. In NR, the primary cell of a master or secondary cell group is sometimes also referred to as the Special Cell (SpCell). Hence, the SpCell in the MCG is the PCell and the SpCell in the SCG is the PSCell.

There are different ways to deploy 5G network with or without interworking with LTE (also referred to as E-UTRA (evolved-UMTS (universal mobile telecommunications system) terrestrial radio access) and evolved packet core (EPC). These different ways to deploy 5G are also known as architecture options. In principle, NR and LTE can be deployed without any interworking, denoted by NR standalone (SA) operation, also known as architecture option 2, that is gNB (NR base station) in NR can be connected to 5G core (5GC) network and eNB in LTE can be connected to EPC with no interconnection between the two, also known as architecture option 1.

On the other hand, the first supported version of NR uses dual connectivity, denoted as EN-DC (E-UTRAN-NR Dual Connectivity), also known as architecture option 3, as illustrated in FIG. 2. In such a deployment, dual connectivity between NR and LTE is applied, where the UE is connected with both the LTE radio interface (LTE Uu in FIG. 2) to an LTE access node and the NR radio interface (NR Uu in FIG. 2) to an NR access node. Further, in EN-DC, the LTE access node acts as the master node (in this case known as the Master eNB, MeNB), controlling the master cell group, MCG, and the NR access node acts as the secondary node (in this case sometimes also known as the Secondary gNB (SgNB)), controlling the secondary cell group, SCG. The SgNB has a user plane connection S1-U to the core network (EPC). The control plane (CP) connection S1-C to the core network (EPC) is instead provided by the MeNB. This is also called as "Non-standalone NR" or, in short, "NSA NR". Notice that in this case the functionality of an NR cell is limited and would be used for connected mode UEs as a booster and/or diversity leg, but an RRC_IDLE UE cannot camp on these NR cells. In EN-DC, there is no connection to the 5G core network (5GC).

Signaling Radio Bearers

"Signalling Radio Bearers" (SRBs) are defined as Radio Bearers (RB) that are used only for the transmission of RRC and NAS (non-access stratum) messages. More specifically, the following SRBs are defined:

- SRB0 is for RRC messages using the CCCH (common control channel) logical channel;
- SRB1 is for RRC messages (which may include a piggybacked NAS message) as well as for NAS messages prior to the establishment of SRB2, all using DCCH (dedicated control channel) logical channel;
- For NB-IoT (narrowband internet-of-things), SRB1bis is for RRC messages (which may include a piggybacked NAS message) as well as for NAS messages prior to the activation of security, all using DCCH logical channel;
- SRB2 is for RRC messages which include logged measurement information as well as for NAS messages and messages which include IAB-DU (integrated access and backhaul—distributed unit) specific F1-C (F1 control plane) related information, all using DCCH logical channel. SRB2 has a lower-priority than SRB1 and is always configured by E-UTRAN (evolved-UMTS (universal mobile telecommunication system) terrestrial radio access network) after security activation. SRB2 is not applicable for NB-IoT;
- SRB4 is for RRC messages which include application layer measurement reporting information, all using DCCH logical channel. SRB4 can only be configured by E-UTRAN after security activation. SRB4 is not applicable for NB-IoT In downlink piggybacking of NAS messages is used only for one dependent (i.e., with joint success/failure) procedure: bearer establishment/modification/release. In uplink NAS message piggybacking is used only for transferring the initial NAS message during connection setup.

NOTE 1: The NAS messages transferred via SRB2 are also contained in RRC messages, which however do not include any RRC protocol control information.

Once security is activated, all RRC messages on SRB1, SRB2 and SRB4, including those containing NAS or non-3GPP messages, are integrity protected and ciphered by PDCP (packet data convergence protocol). NAS independently applies integrity protection and ciphering to the NAS messages.

For a UE configured with DC, all RRC messages, regardless of the SRB used and both in downlink and uplink, are transferred via the MCG. In case of EN-DC, after connection establishment NR PDCP may be configured for both SRB1 and SRB2 and if so, these SRBs may be configured as split SRB. In case of NGEN-DC (NG-RAN EUTRA-NR Dual Connectivity) and NE-DC (NR-EUTRA Dual Connectivity), NR PDCP is always configured. For a split SRB, the UE receives RRC messages via both MCG and NR SCG i.e. handles out of order and duplicate PDUs (protocol data units) as specified in TS 38.323. For a split SRB, the network configures via which cell group(s) the UE sends uplink RRC messages.

NOTE 2: In case of (NG)EN-DC, SRB3 may be configured for the transfer of some NR RRC messages between UE and SgNB via the NR radio interface, see TS 38.331.

An SRB can be configured with PDCP duplication, either by two logical channels within the same CG (CA duplication) or by two logical channels each within a different CG (DC duplication).

Security

Access Stratum (AS) security includes the integrity protection of RRC signalling (signalling radio bearers (SRBs)) as well as the ciphering of RRC signalling (SRBs) and user data (data radio bearers (DRBs)).

RRC handles the configuration of the security parameters which are part of the AS configuration: the integrity protection algorithm, the ciphering algorithm and two parameters, namely the keyChangeIndicator and the nextHopChainingCount, which are used by the UE to determine the AS security keys upon handover, connection re-establishment, connection resume, UP-EDT (user plane—early data transmission) and/or UP (user plane) transmission using PUR (preconfigured uplink resources).

The integrity protection algorithm is common for signalling radio bearers SRB1, SRB2 and SRB4. When configured with MCG only, the ciphering algorithm is common for all radio bearers (i.e. SRB1, SRB2, SRB4 and DRBs). Neither integrity protection nor ciphering applies for SRB0.

RRC integrity and ciphering are always activated together, i.e., in one message/procedure. RRC integrity and ciphering are never de-activated. However, it is possible to switch to a 'NULL' ciphering algorithm (eea0).

The 'NULL' integrity protection algorithm (eia0) is used only for the UE in limited service mode, as specified in TS 33.401. In case the 'NULL' integrity protection algorithm is used, 'NULL' ciphering algorithm is also used.

NOTE 1: Lower layers discard RRC messages for which the integrity check has failed and indicate the integrity verification check failure to RRC.

The AS applies three different security keys: one for the integrity protection of RRC signalling (KRRCint), one for the ciphering of RRC signalling (KRRCenc) and one for the ciphering of user data (KUPenc). All three AS keys are derived from the KeNB key. The KeNB is based on the KASME key for E-UTRA/EPC, or KAMF for E-UTRA/5GC, which is handled by upper layers.

Upon connection establishment, new AS keys are derived. No AS-parameters are exchanged to serve as inputs for the derivation of the new AS keys at connection establishment.

The integrity and ciphering of the RRC message used to perform handover is based on the security configuration used prior to the handover and is performed by the source eNB.

The integrity and ciphering algorithms can only be changed upon handover. The four AS keys (KeNB, KRRCint, KRRCenc and KUPenc) change upon every handover, connection re-establishment, connection resume, UP-EDT and UP transmission using PUR. The keyChangeIndicator is used upon handover and indicates whether the UE should use the keys associated with the KASME key for E-UTRA/EPC, or KAMF for E-UTRA/5GC, taken into use with the latest successful NAS SMC (non access stratum security mode command) procedure. The nextHopChainingCount parameter is used upon handover, connection re-establishment, connection resume, UP-EDT and UP transmission using PUR by the UE when deriving the new KeNB that is used to generate KRRCint, KRRCenc and KUPenc (see TS 33.401 [32]). An intra cell handover procedure may be used to change the keys in RRC_CONNECTED.

For each radio bearer an independent counter (e.g., COUNT, as specified in TS 36.323 for E-UTRA/EPC, and TS 38.323 [83] for E-UTRA/5GC) is maintained for each direction. For each DRB, the COUNT is used as input for ciphering. For each SRB, the COUNT is used as input for both ciphering and integrity protection. It is not allowed to use the same COUNT value more than once for a given security key. At connection resume the COUNT is reset. As specified in TS 33.401 subclause 7.2.9.1, the eNB is responsible for avoiding reuse of the COUNT with the same RB identity and with the same KeNB, e.g., due to the transfer of large volumes of data, release and establishment of new RBs, and multiple termination point changes for RLC-UM (radio link control unacknowledged mode) bearers, multiple termination point changes for RLC-AM (RLC acknowledge mode) bearer with SN terminated PDCP re-establishment (COUNT reset) due to SN only full configuration whilst the key stream inputs (i.e. bearer ID, security key) at MN have not been updated. In order to avoid such re-use, the eNB may e.g., use different RB identities for successive RB establishments, trigger an intra cell handover or by triggering a transition from RRC_CONNECTED to RRC_IDLE or RRC_INACTIVE and then back to RRC_CONNECTED.

In order to limit the signalling overhead, individual messages/packets include a short sequence number, PDCP SN (PDCP sequence number), as specified in TS 36.323 for E-UTRA/EPC, and TS 38.323 [83] for E-UTRA/5GC). In addition, an overflow counter mechanism is used: the hyper frame number (TX_HFN and RX_HFN, as specified in TS 36.323 for E-UTRA/EPC, and HFN (hyper frame number) as specified in TS 38.323 for E-UTRA/5GC). The HFN needs to be synchronized between the UE and the eNB.

For each SRB, the value provided by RRC to lower layers to derive the 5-bit BEARER parameter used as input for ciphering and for integrity protection is the value of the corresponding srb-Identity with the MSBs (most significant bits) padded with zeroes.

With E-UTRA/5GC for a UE not capable of NGEN-DC, the same ciphering algorithm signalled at SMC or handover is used for all radio bearers. Likewise, the same integrity algorithm signalled at SMC or handover is used for all SRBs.

In case of DC, a separate KeNB is used for SCG-DRBs (S-KeNB). This key is derived from the key used for the MCG (KeNB) and an SCG counter that is used to ensure freshness. To refresh the S-KeNB e.g., when the COUNT will wrap around, E-UTRAN employs an SCG change, i.e., an RRCConnectionReconfiguration message including mobilityControlInfoSCG. When performing handover, while at least one SCG-DRB remains configured, both KeNB and S-KeNB are refreshed. In such case E-UTRAN performs handover with SCG change i.e. an RRCConnectionReconfiguration message including both mobilityControlInfo and mobilityControlInfoSCG. The ciphering algorithm is common for all radio bearers within a CG but may be different between MCG and SCG. The ciphering algorithm for SCG DRBs can only be changed upon SCG change.

In case of (NG) EN-DC or of SN terminated RB without SCG, the network indicates whether the UE shall use either KeNB or S-KgNB for a particular DRB. In case of NE-DC, the network indicates whether the UE shall use either KgNB or S-KeNB for a particular DRB. S-KgNB/S-KeNB is derived from KeNB/KgNB as defined in TS 33.501 [86], uses a different counter (sk-Counter) and is used only for DRBs using NR PDCP. Whenever there is a need to refresh S-KgNB/S-KeNB, e.g. upon change of MN or SN, the NR SCG reconfiguration with sync and key change is used for S-KgNB refresh and the RRCConnectionReconfiguration message including mobilityControlInfoSCG is used for S-KeNB refresh. E-UTRAN provides a UE configured with (NG)EN-DC with an sk-Counter even when no DRB is setup using S-KgNB i.e., to facilitate configuration of SRB3. The same ciphering algorithm as signalled by nr-RadioBearerConfig1 and nr-RadioBearerConfig2 as defined in TS 38.331 is used for all radio bearers using the same key (i.e. KeNB or S-KgNB). Likewise, the same integrity algorithm as signalled by nr-RadioBearerConfig1 and nr-RadioBearerConfig2 as defined in TS 38.331 is used for all SRBs using the same key. Although NR RRC uses different values for the security algorithms than E-UTRA, the actual algorithms are the same in case of (NG)EN-DC and NE-DC in this version of the specification. Hence, for such algorithms, the security capabilities supported by a UE are consistent across these RATs. For MR-DC, integrity protection is not enabled for DRBs terminated on eNB or when the master node is an ng-eNB (next generation eNB).

NOTE 2: The network ensures that different values are used for the SCG counter and for the sk-Counter when deriving S-KgNB and/or S-KeNB from the same master key.

Actions Related to Transmission of RRCConnectionResumeRequest Message

If the UE is resuming the RRC connection from a suspended RRC connection, the UE shall set the contents of RRCConnectionResumeRequest message as follows:

1> if the UE is a NB-IoT UE; or
1> if the UE is initiating UP-EDT for mobile originating calls in accordance with conditions in 5.3.3.1b; or
1> if the UE is initiating UP transmission using PUR in accordance with conditions in 5.3.3.1c; or
1> if field useFullResumeID is signalled in SystemInformationBlockType2:
  2> if the UE connected to 5GC is a BL UE (bandwidth reduced low complexity UE) or UE in CE (UE in covered extension):
    3> set thefullI-RNTI to the storedfullI-RNTI;
  2> else:
    3> set the resumeID to the stored resumeIdentity;
1> else:
  2> if the UE connected to 5GC is a BL UE or UE in CE:
    3> set the shortI-RNTI to the stored shortI-RNTI;
  2> else:
    3> set the truncatedResumeID to include bits in bit position 9 to 20 and 29 to 40 from the left in the stored resumeIdentity.
1> if the UE is resuming the RRC connection after release with redirect with mpsPriorityIndication:
  2> set the resumeCause to highPriorityAccess;
1> else if the UE supports mo-VoiceCall establishment cause and UE is resuming the RRC connection for mobile originating MMTEL voice and SystemInformationBlockType2 includes voiceServiceCauseIndication and the establishment cause received from upper layers is not set to highPriorityAccess:
  2> set the resumeCause to mo-VoiceCall;
1> else if the UE supports mo-VoiceCall establishment cause for mobile originating MMTEL video and UE is resuming the RRC connection for mobile originating MMTEL video and SystemInformationBlockType2 includes videoServiceCauseIndication and the establishment cause received from upper layers is not set to highPriorityAccess:
  2> set the resumeCause to mo-VoiceCall;
1> else if the UE is initiating UP-EDT for mobile terminating calls in accordance with conditions in 5.3.3.1b:
  2> set the resumeCause to mt-EDT;
1> else:
  2> set the resumeCause in accordance with the information received from upper layers;
1> set the shortResumeMAC-I to the 16 least significant bits of the MAC-I (message authentication code—integrity) calculated:
  2> over the ASN.1 encoded as per clause 8 (i.e., a multiple of 8 bits) VarShortResumeMAC-Input (or VarShortResumeMAC-Input-NB in NB-IoT);
  2> with the KRRCint key and the previously configured integrity protection algorithm; and
  2> with all input bits for COUNT, BEARER and DIRECTION set to binary ones;
1> if the UE is a NB-IoT UE:
  2> if the UE supports DL channel quality reporting in MSG3 and cqi-Reporting (channel quality indicator-Reporting) is present in SystemInformationBlockType2-NB:
    3> set the cqi-NPDCCH to include the latest results of the downlink channel quality measurements of the carrier where the random access response is received as specified in TS 36.133 [16]; NOTE 0: The downlink channel quality measurements use measurement period T1 or T2, as defined in TS 36.133 [16].
  2> if the UE is connected to EPC, set earlyContentionResolution to TRUE;
1> restore the RRC configuration and security context from the stored UE AS context, except for the following:

MCG SCell(s) configuration, if stored,
nr-SecondaryCellGroupConfig, if stored;

1> if the UE is initiating UP-EDT for mobile originating calls in accordance with conditions in 5.3.3.1b:
  2> if the UE is a NB-IoT UE connected to EPC:
    3> if the UE has ANR (automatic neighbor relations) measurements information available in VarANR-MeasReport-NB and if the RPLMN (registered public land mobile network) is included in plmn-IdentityList stored in VarANR-MeasReport-NB;
      4> set anr-InfoAvailable to TRUE;
1> if the UE is resuming an RRC connection after early security reactivation in accordance with conditions in 5.3.3.18:

2> if the UE is initiating UP-EDT in accordance with conditions in 5.3.3.1b; or

2> if the UE is initiating UP transmission using PUR in accordance with conditions in 5.3.3.1c:

3> if drb-ContinueROHC has been provided in immediately preceding RRC connection release message, and the UE is requesting to resume RRC connection in the same cell:

4> indicate to lower layers that stored UE AS context is used and that drb-ContinueROHC is configured;

4> continue the header compression protocol context for the DRBs configured with the header compression protocol;

3> else:

4> indicate to lower layers that stored UE AS context is used;

4> reset the header compression protocol context for the DRBs configured with the header compression protocol;

3> resume all SRBs and all DRBs;

2> else:

3> if the UE is a NB-IoT UE or the UE is connected to EPC, restore the PDCP state and re-establish the PDCP entity for SRB1;

3> if the UE is connected to 5GC:

4> apply the default configuration for SRB1 as specified in 9.2.1.1;

4> except for NB-IoT, apply the default NR PDCP configuration as specified in TS 38.331 [82], clause 9.2.1 for SRB1;

3> resume SRB1;

2> derive the KeNB key based on the KASME key to which the current KeNB is associated, using the stored value of nextHopChainingCount received in the RRCConnectionRelease message in the preceding connection, as specified in TS 33.401 [32] for EPC and TS 33.501 [86] for 5GC;

2> derive the KRRCint key associated with the previously configured integrity algorithm, as specified in TS 33.401 [32] for EPC and TS 33.501 [86] for 5GC;

2> derive the KRRCenc key and the KUPenc key associated with the previously configured ciphering algorithm, as specified in TS 33.401 [32] for EPC and TS 33.501 [86] for 5GC;

2> configure lower layers to resume integrity protection using the previously configured algorithm and the KRRCint key derived in this clause to all subsequent messages received and sent by the UE;

2> configure lower layers to resume ciphering and to apply the ciphering algorithm and the KRRCenc key derived in this clause to all subsequent messages received and sent by the UE;

2> configure lower layers to resume ciphering and to apply the ciphering algorithm and the KUPenc key derived in this clause immediately to the user data sent and received by the UE;

2> if the UE is initiating UP-EDT for mobile originated calls in accordance with conditions in 5.3.3.1b:

3> configure the lower layers to use EDT;

2> else if the UE is initiating UP transmission using PUR in accordance with conditions in 5.3.3.1c:

3> configure, except pur-TimeAlignmentTimer, the lower layers to use transmission using PUR;

3> deliver the UL grant for transmission using PUR to the MAC (medium access control) entity;

1> else:

2> if SRB1 was configured with NR PDCP:

3> for SRB1, release the NR PDCP entity and establish an E-UTRA PDCP entity with the current (MCG) security configuration; NOTE 1: The UE applies the LTE ciphering and integrity protection algorithms that are equivalent to the previously configured NR security algorithms.

2> else:

3> for SRB1, restore the PDCP state and re-establish the PDCP entity;

If the UE is resuming the RRC connection from RRC_INACTIVE, the UE shall set the contents of RRCConnectionResumeRequest message as follows:

2> if field useFullResumeID is signalled in SystemInformationBlockType2:

3> set thefullI-RNTI to the storedfullI-RNTI value provided in suspend;

2> else:

3> set the shortI-RNTI to the stored shortI-RNTI value provided in suspend;

2> restore the RRC configuration, RoHC (robust header compression) state, the stored QoS (quality of service) flow to DRB mapping rules and the $K_{eNB}$ and $K_{RRCint}$ keys from the UE Inactive AS context except for the following:

MCG physical layer,

MCG MAC configuration,

NR pdcp-Config,

MCG SCell configurations, if stored, nr-Secondary CellGroupConfig, if stored;

2> set the shortResumeMAC-I to the 16 least significant bits of the MAC-I calculated:

3> over the ASN.1 encoded as per clause 8 (i.e., a multiple of 8 bits) VarShortINACTIVE-MAC-Input;

3> with the $K_{RRCint}$ key in the UE Inactive AS Context and the previously configured integrity protection algorithm; and 3> with all input bits for COUNT, BEARER and DIRECTION set to binary ones;

2> derive the KeNB key based on the current KeNB or the NH, using the stored nextHopChainingCount value, as specified in TS 33.501 [86];

2> derive the $K_{RRCenc}$ key, the $K_{RRCint}$ and the $K_{UPenc}$ key, as specified in TS 33.401 [32];

2> apply the default configuration for SRB1 as specified in 9.2.1.1;

2> apply the default NR PDCP configuration as specified in TS 38.331 [82], clause 9.2.1 for SRB1;

2> configure lower layers to resume integrity protection for all SRBs except SRB0 using the configured algorithm and the $K_{RRCint}$ key derived in this clause immediately, i.e., integrity protection shall be applied to all subsequent messages received and sent by the UE;

2> configure lower layers to resume ciphering for all radio bearers except SRB0 and to apply the configured ciphering algorithm, the $K_{RRCenc}$ key and the $K_{UPenc}$ key derived in this clause, i.e., the ciphering configuration shall be applied to all subsequent messages received and sent by the UE;

The Following procedures are applied for both suspended RRC connection and RRC_INACTIVE:

2> resume SRB1;

NOTE 2: Until successful connection resumption, the default physical layer configuration and the default MAC Main configuration are applied for the transmission of SRB0 and SRB1, and SRB1 is used only for the transfer of RRCConnectionResume message, and RRCConnectionRelease message if security has been re-activated.

The UE shall submit the RRCConnectionResumeRequest message to lower layers for transmission.

The UE shall continue cell re-selection related measurements as well as cell re-selection evaluation.

If the UE is resuming the RRC connection from RRC_INACTIVE and if lower layers indicate an integrity check failure while T300 is running, the UE shall perform actions specified in 5.3.3.16.

There currently exist certain challenge(s). According to the current TS 36.331, a UE supporting EN-DC can be configured with NR PDCP even if camping in an LTE cell. This is mainly to support the fast setup of EN-DC and the setup of split SRB that is only supported by the NR PDCP. When using the NR PDCP, the UE use NR security algorithms to perform integrity protection and ciphering.

Even if the network has full control of the PDCP and security configurations at the UE, in case the UE needs to perform an RRC reestablish procedure, the current specification mandate the UE to roll back to the LTE PDCP (if the NR PDCP was previously configured) and to use the LTE ciphering and integrity protection algorithms that are equivalent to the previously configured NR security algorithms.

2> if SRB1 was configured with NR PDCP:

3> for SRB1, release the NR PDCP entity and establish an E-UTRA PDCP entity with the current (MCG) security configuration;

NOTE 1: The UE applies the LTE ciphering and integrity protection algorithms that are equivalent to the previously configured NR security algorithms.

SUMMARY

According to this, there is a backward compatibility issue as more (new) security algorithms are added in NR and that do not have an equivalent in LTE (i.e., the security algorithms are NR-only).

In this case, if a new NR security algorithm was introduced in the specification and configured at the UE, the UE when performing RRC reestablishment will not know what equivalent LTE security algorithm to use and this it may lead to multiple undefined behaviors (and also a misalignment with the network configuration), including releasing the RRC connection and reinitiate the RRC connection from scratch. This will of course lead to a very long connectivity interruption and that is not ideal for delay sensitive applications such as public safety or URLLC (ultra reliable low latency communication).

Certain aspects of the various embodiments on inventive concepts may provide solutions to these or other challenges. The methods and solutions described herein aim at avoiding any backward compatibility issue on the UE and network when new security algorithms are added in NR but not in LTE (i.e., the new security algorithm in NR does not have an equivalent also in LTE). In such a case, in order to avoid wrong behaviors on the UE when performing the RRC reestablishment procedure, if the UE is configured with an NR security algorithm that does not have an equivalent in LTE, when performing the RRC reestablishment procedure and roll back to the LTE PDCP, one or more of the following solutions may be adopted:

The UE uses a default LTE security algorithm (that may be different from the previously configured in NR).

The UE uses the "null" algorithm.

The UE selects an LTE-algorithm based on a rule.

The UE selects an LTE-algorithm based on an indication received from the network.

The UE decides which algorithm to use by himself and eventually can notify on his choice the network.

The UE before sending a RRC reestablishment complete message to the network, it sends a new or an existing RRC message to the network in order to ask which LTE algorithm should be used.

The UE autonomously releases the RRC connection and transit to RRC_IDLE. This eventually will lead the UE to perform random access towards the same cell in order to initiate a new RRC connection.

The UE triggers a new (re)selection for selecting a new cell and then perform random access towards the new cell.

According to some embodiments, a method performed by a communication device configured with a packet data convergence protocol, PDCP, security algorithm associated with a first radio access technology, RAT, includes responsive to the communication device being configured with a first PDCP security algorithm in the first RAT that does not have an equivalent security algorithm in a second RAT, determining a second security algorithm to use when performing radio resource control, RRC, reestablishment with the second RAT. The method includes using the second security algorithm when performing RRC reestablishment with the second RAT.

According to some other embodiments, a communication device, configured with a packet data convergence protocol, PDCP, security algorithm associated with a first radio access technology, RAT, the communication device is adapted to: responsive to the communication device being configured with a first PDCP security algorithm in the first RAT that does not have an equivalent security algorithm in a second RAT, determine a second security algorithm to use when performing radio resource control, RRC, reestablishment with the second RAT; and use the second security algorithm when performing RRC reestablishment with the second RAT.

Analogous computer program and computer program products are provided.

Certain embodiments may provide one or more of the following technical advantage(s). Using the various embodiments of inventive concepts, a UE that was previously configured to use a new NR security algorithm (with NR PDCP) with no equivalent algorithm in LTE (when using LTE PDCP) when connected to an eNB, when performing RRC reestablishment will know what equivalent LTE security algorithm should use.

This will avoid having any unspecified behavior (and a configuration mismatch on the UE and network) on the UE with a consequent long connectivity interruption, since the UE may release autonomously the RRC connection or may trigger RLF (radio link failure) due to a configuration error.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
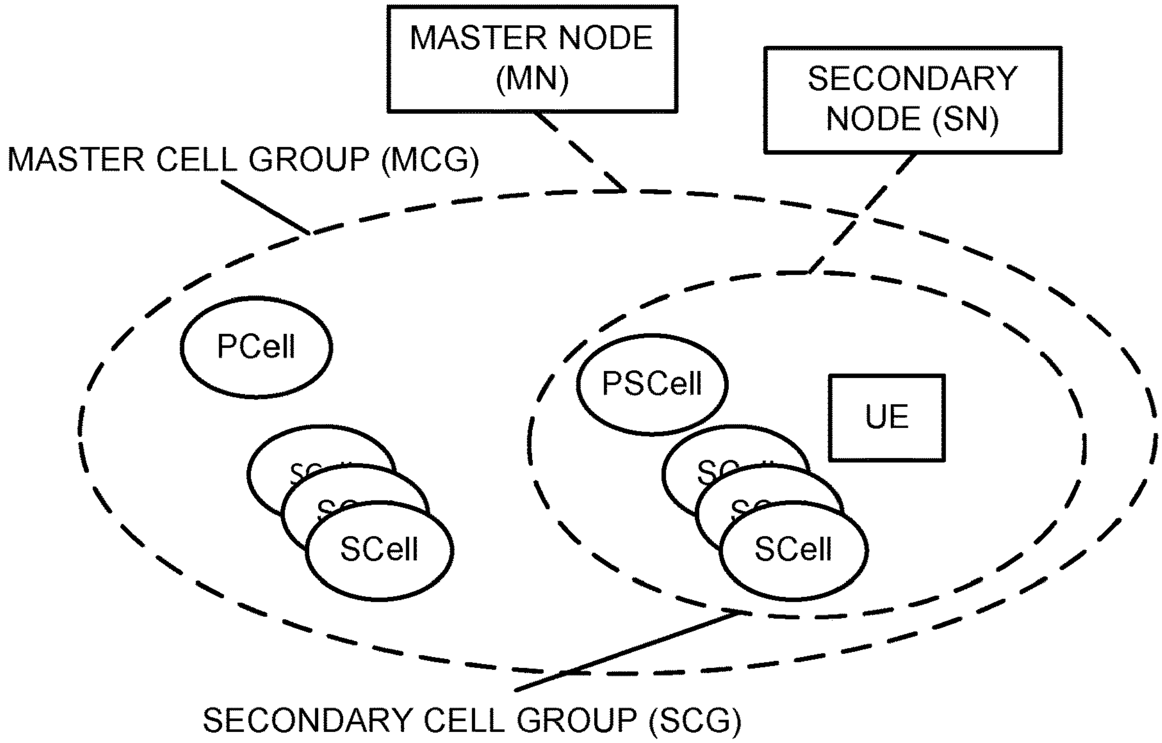
FIG. 1 is an illustration of dual connectivity combined with carrier aggregation in MR-DC according to some embodiments.
Figure 2:
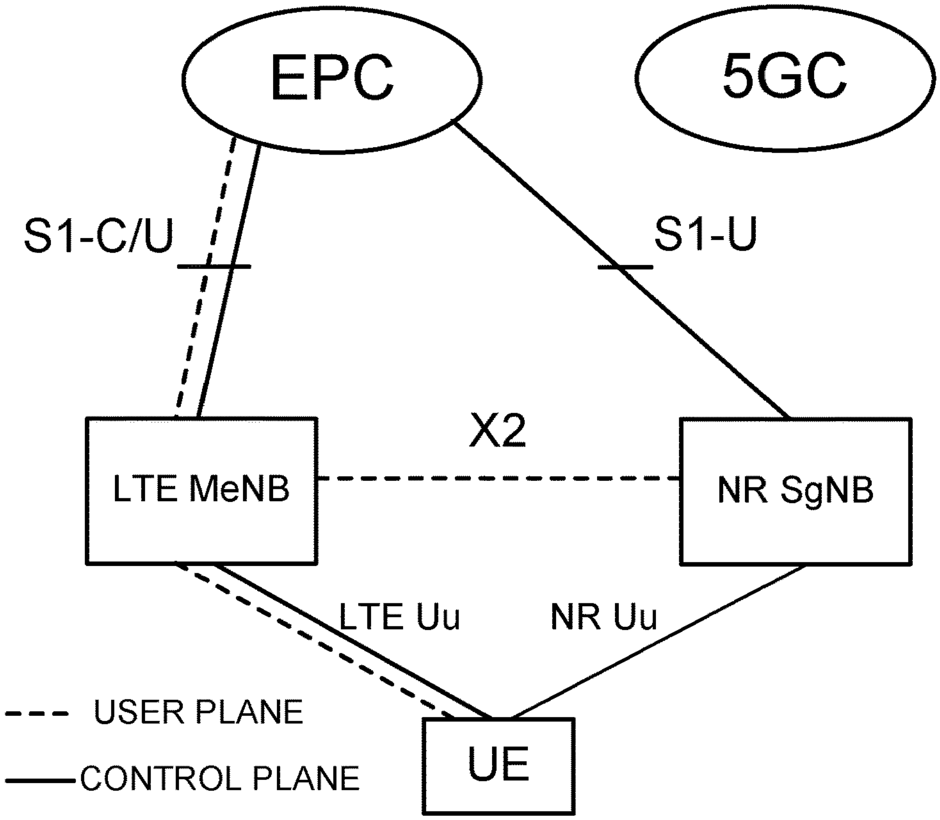
FIG. 2 is an illustration of E-UTRAN-NR Dual Connectivity (EN-DC) according to some embodiments.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

As previously indicated, there is a backward compatibility issue as more (new) security algorithms are added in NR and that do not have an equivalent also in LTE (i.e., the security algorithms are NR-only).

In this case, if a new NR security algorithm is introduced in the specification and configured at the UE, the UE when performing RRC reestablishment will not know what equivalent LTE security algorithm to use and this it may lead to multiple undefined behaviors (and also a misalignment with the network configuration), including releasing the RRC connection and reinitiate the RRC connection from scratch. This will of course lead to a very long connectivity interruption and that is not ideal for delay sensitive applications such as public safety or URLLC.

What is described herein applies mainly to LTE but it can also be applied to NR or any other RAT.

The scenario considered in the embodiment is when the UE is connected to an eNB and is configured with an NR PDCP and with NR security algorithm for the integrity protection and ciphering that do not have an equivalent algorithm also in LTE. When the UE perform RRC reestablishment, the UE should release the NR PDCP entity and establish an E-UTRA PDCP entity and also chose which LTE security algorithm to use.

In some embodiments of inventive concepts, a UE previously configured with an NR PDCP entity when performing the RRC reestablishment procedure and roll back to the LTE PDCP entity, uses a default LTE security algorithm that may be different from the previously configured security algorithm in NR or that may not have an equivalent algorithm in NR. What default LTE security algorithm to use can be decided upfront by the network in the first setup of the RRC connection, or it can be hard-coded in the specification. In one version of these embodiments of inventive concepts, the default algorithm is the null-algorithm. In another version of these embodiments of inventive concepts, the default algorithm is an algorithm which is mandatory to support.

In other embodiments of inventive concepts, a UE previously configured with an NR PDCP entity when performing the RRC reestablishment procedure and roll back to the LTE PDCP entity, uses an LTE security algorithm selected based on a rule. The selected algorithm may be different from the previously configured in NR or that may not have an equivalent algorithm in NR. The rule may take as input which NR security algorithm was used before the reestablishment. For example, if the UE used NR algorithm X before the reestablishment procedure, the UE would use LTE algorithm A after the reestablishment. But if the UE was using NR algorithm Y before the reestablishment, the UE will use the LTE algorithm B after the reestablishment.

In further embodiments of inventive concepts, a UE previously configured with an NR PDCP entity when performing the RRC reestablishment procedure and roll back to the LTE PDCP entity, uses an LTE security algorithm selected based on an indication sent from the network to the UE prior to the reestablishment. The selected algorithm may be different from the previously configured in NR or that may not have an equivalent algorithm in NR. The network may indicate that, in case it needs to change from LTE PDCP to NR PDCP, the UE shall use a particular LTE algorithm. For example, the network can configure the UE to use NR algorithm X, but the network would also indicate that if the UE needs to change to LTE PDCP the UE shall apply LTE algorithm B.

In yet other embodiments of inventive concepts, a UE previously configured with an NR PDCP entity when performing the RRC reestablishment procedure and roll back to the LTE PDCP entity, uses an LTE security algorithm selected based on an indication from the network node towards which the UE reestablishes the connection. The selected algorithm may be different from the previously configured in NR or that may not have an equivalent algorithm in NR. The network node which the UE reestablishes to, may indicate that the UE shall use a particular LTE algorithm in case the UE reestablishes to the network node. This indication could be indicated to the UE for example in system information.

In additional embodiments of inventive concepts, a UE previously configured with an NR PDCP entity when performing the RRC reestablishment procedure and roll back to the LTE PDCP entity, decides which algorithm to use by itself and eventually can notify the choice to the network. If the UE decided to notify the network, the UE may use a new RRC message or an existing one (e.g. the UE may add this info directly in the RRC reestablishment request message). Further, if a new message is used on an existing one that is not the RRC reestablishment request message, the UE may send this information to the network before or after the RRC reestablishment request message.

In still other embodiments of inventive concepts, a UE previously configured with an NR PDCP entity when performing the RRC reestablishment procedure and roll back to the LTE PDCP entity, before applying the LTE security algorithm and sending the RRC reestablishment request message to the network, sends a new or an existing RRC message (e.g., UE assistance information) to the network in order to ask which LTE algorithm should be used. When receiving the request, the network may either send a dedicated RRC message to the UE with the LTE security algorithm to use, or it can broadcast the LTE algorithm to use in system information.

In further embodiment of inventive concepts, a UE previously configured with an NR PDCP entity when performing the RRC reestablishment procedure and roll back to the LTE PDCP entity, autonomously releases the RRC connection and transits to RRC_IDLE. In this case, when the UE transit to RRC_IDLE, it may simply trigger random access towards the same cell in order to initiate a new RRC connection. When triggering random access and sending the RRC setup request, the UE may inform the network that this is because of a conflict in what LTE security algorithm to choose upon RRC reestablishment.

In yet further embodiments of inventive concepts, a UE previously configured with an NR PDCP entity when performing the RRC reestablishment procedure and roll back to the LTE PDCP entity, triggers a new (re)selection procedure for selecting a new cell and then perform random access towards the new cell. In such a case, the UE may release the previous RRC connection autonomously before performing the random access procedure towards the new cell. Alternatively, the UE releases the previous RRC connection only upon an indication from the old cell. This means that when performing random access RACH towards the new cell, the new cell will inform the old cell (via inter-node RRC message or via X2/Xn signalling) that the UE could not perform the RRC reestablishment procedure and thus needs to be released. As a further option, the new cell may inform the new cell that the reason for releasing the UE is the conflict in selecting an LTE security algorithm that does not have an equivalent in NR.

Figure 3:
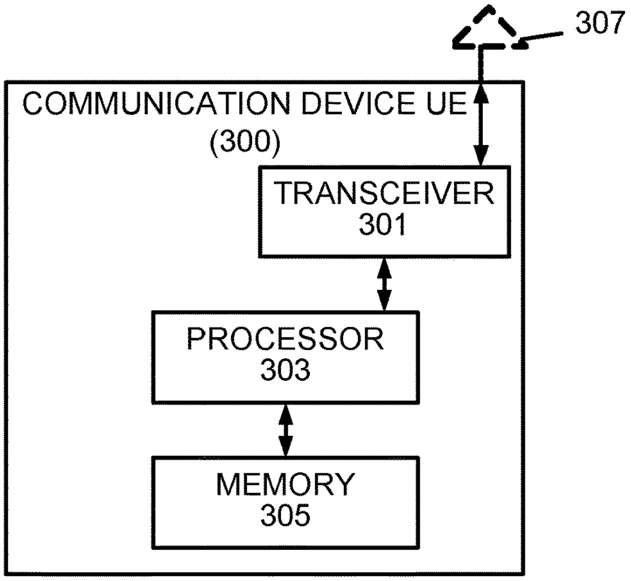
FIG. 3 is a block diagram illustrating a wireless device UE according to some embodiments of inventive concepts.

FIG. 3 is a block diagram illustrating elements of a communication device 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless devices UE 1612A, UE 1612B, and wired or wireless devices UE 1612C, UE 1612D of FIG. 16, UE 1700 of FIG. 17, virtualization hardware 2004 and virtual machines 2008A, 2008B of FIG. 20, and UE 2106 of FIG. 21, all of which should be considered interchangeable in the examples and embodiments described herein and be within the intended scope of this disclosure, unless otherwise noted.) As shown, communication device UE may include an antenna 307 (e.g., corresponding to antenna 1722 of FIG. 17), and transceiver circuitry 301 (also referred to as a transceiver, e.g., corresponding to interface 1712 of FIG. 17 having transmitter 1718 and receiver 1720) including a transmitter and a receiver configured to provide uplink and downlink radio communications with a base station(s) (e.g., corresponding to network node 1610A, 1610B of FIG. 16, network node 1800 of FIG. 18, and network node 2104 of FIG. 21 also referred to as a RAN node) of a radio access network. Communication device UE may also include processing circuitry 303 (also referred to as a processor, e.g., corresponding to processing circuitry 1702 of FIG. 17, and control system 2012 of FIG. 20) coupled to the transceiver circuitry, and memory circuitry 305 (also referred to as memory, e.g., corresponding to memory 1710 of FIG. 16) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 4:
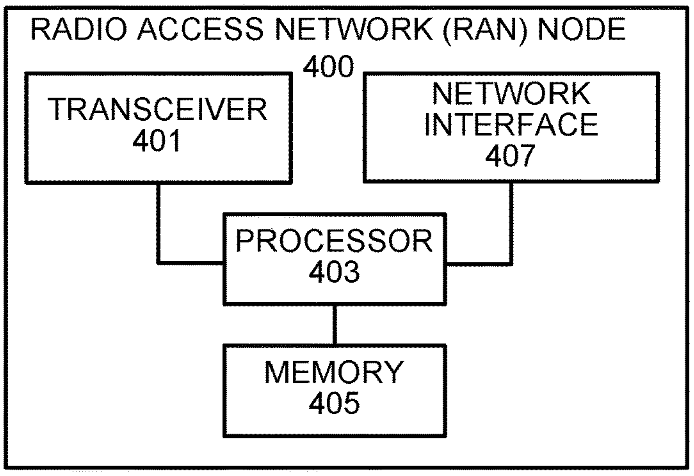
FIG. 4 is a block diagram illustrating a radio access network RAN node (e.g., a base station eNB/gNB) according to some embodiments of inventive concepts.

FIG. 4 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 1610A, 1610B of FIG. 16, network node 1800 of FIG. 18, hardware 2004 or virtual machine 2008A, 2008B of FIG. 20, and/or base station 2104 of FIG. 21, all of which should be considered interchangeable in the examples and embodiments described herein and be within the intended scope of this disclosure, unless otherwise noted.) As shown, the RAN node may include transceiver circuitry 401 (also referred to as a transceiver, e.g., corresponding to portions of RF transceiver circuitry 1812 and radio front end circuitry 1818 of FIG. 18) including a transmitter and a receiver configured to provide uplink and downlink radio communications with mobile terminals. The RAN node may include network interface circuitry 407 (also referred to as a network interface, e.g., corresponding to portions of communication interface 1806 of FIG. 18) configured to provide communications with other nodes (e.g., with other base stations) of the RAN and/or core network CN. The network node may also include processing circuitry 403 (also referred to as a processor, e.g., corresponding to processing circuitry 1802 of FIG. 18) coupled to the transceiver circuitry, and memory circuitry 405 (also referred to as memory, e.g., corresponding to memory 1804 of FIG. 18) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 5:
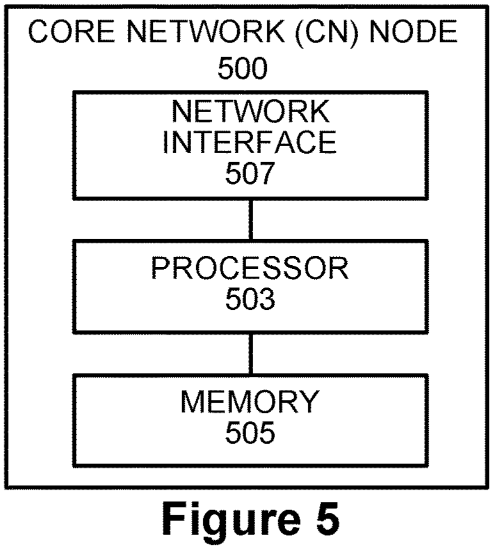
FIG. 5 is a block diagram illustrating a core network CN node (e.g., an AMF node, an SMF node, etc.) according to some embodiments of inventive concepts.

FIG. 5 is a block diagram illustrating elements of a core network (CN) node (e.g., an SMF (session management function) node, an AMF (access and mobility management function) node, etc.) of a communication network configured to provide cellular communication according to embodiments of inventive concepts. (CN node 500 may be provided, for example, as discussed below with respect to core network node 1608 of FIG. 16, hardware 2004 or virtual machine 2008A, 2008B of FIG. 20, all of which should be considered interchangeable in the examples and embodiments described herein and be within the intended scope of this disclosure, unless otherwise noted) As shown, the CN node may include network interface circuitry 507 configured to provide communications with other nodes of the core network and/or the radio access network RAN. The CN node may also include a processing circuitry 503 (also referred to as a processor,) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

In the description that follows, while the communication device may be any of the communication device 300, wireless device 1612A, 1612B, wired or wireless devices UE 1612C, UE 1612D, UE 1700, virtualization hardware 2004, virtual machines 2008A, 2008B, or UE 2106, the communication device 300 shall be used to describe the functionality of the operations of the communication device. Operations of the communication device 300 (implemented using the structure of the block diagram of FIG. 3) will now be discussed with reference to the flow charts of FIGS. 6-14 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow chart.

Figure 6:
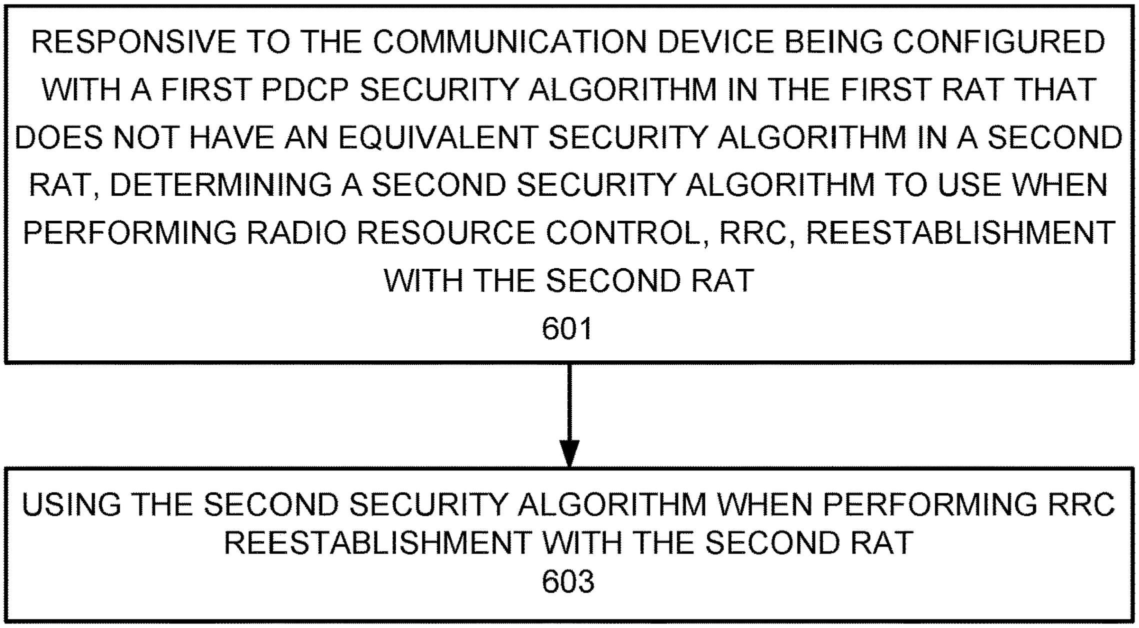
FIGS. 6-15 are flow charts illustrating operations of a communication device according to some embodiments of inventive concepts.

FIG. 6 illustrates operations the communication device 300 performs in various embodiments of inventive concepts. Turning to FIG. 6, in block 601, the processing circuitry 303, responsive to the communication device being configured with a first PDCP security algorithm in a first radio access technology, RAT, that does not have an equivalent security algorithm in a second RAT, determines a second security algorithm to use when performing radio resource control, RRC, reestablishment with the second RAT. In block 603, the processing circuitry 303 uses the second security algorithm when performing RRC reestablishment with the second RAT.

In some embodiments, the first RAT and the second RAT are in a same network. In other embodiments, the first RAT and the second RAT are in different networks. In other embodiments, the first RAT is a new radio, NR, RAT and the second RAT is a long-term evolution, LTE, RAT. Thus, the various embodiments describe herein can be used when the communication device is changing from a first RAT to a second RAT when the second RAT does not have an equivalent security algorithm to the first PDCP security algorithm.

FIGS. 7-14 illustrate various embodiments of determining the second security algorithm to use.

Figure 7:
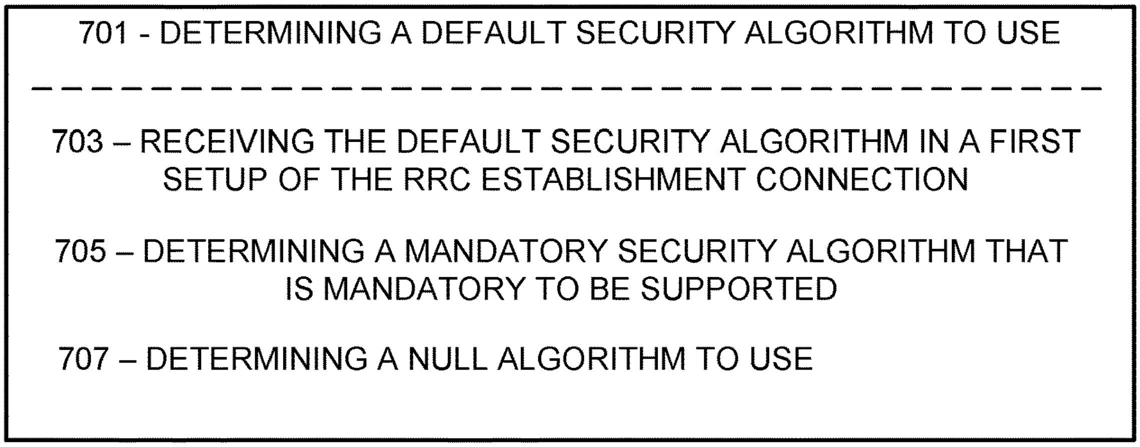

Turning to FIG. 7, in some embodiments, the processing circuitry 303 in block 701 determines the second security algorithm to use by determining a default security algorithm to use. In some of these embodiments, the processing circuitry 303 in block 703 determines the default security algorithm to use by receiving the default security algorithm in a first setup of the RRC reestablishment connection. In other embodiments, the processing circuitry 303 in block 705 determines the default security algorithm to use by determining a mandatory security algorithm that is mandatory to be supported. In yet other embodiments, the processing circuitry 303 determines the default security algorithm to use by determining a null algorithm to use.

Figure 8:
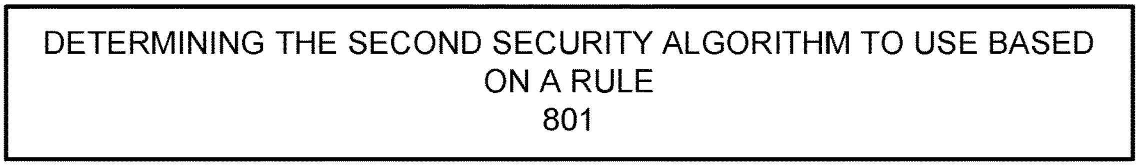

Turing to FIG. 8, in some other embodiments, the processing circuitry 303 in block 801 determines the second security algorithm to use by determining the second security algorithm to use based on a rule. As explained above, the rule may take as input which NR security algorithm was used before the reestablishment. For example, if the communication device 300 used NR algorithm X before the reestablishment procedure, the communication device 300 will use LTE algorithm A after the reestablishment. But if, for example, the communication device 300 was using NR algorithm Y before the reestablishment, the communication device 300 will use the LTE algorithm B after the reestablishment.

Figure 9:
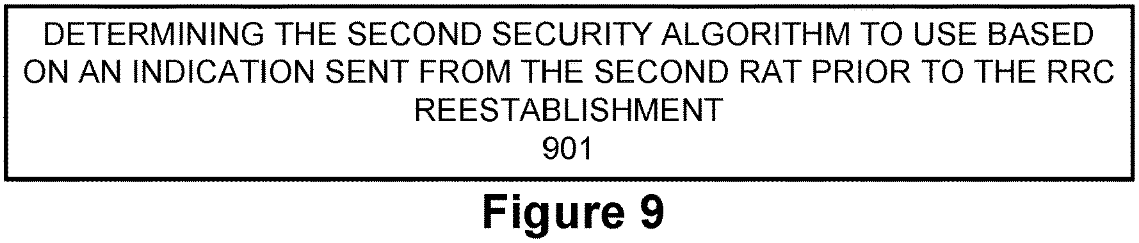

Turning to FIG. 9, in yet other embodiments, the processing circuitry 303 in block 901 determines the second security algorithm to use by determining the second security algorithm based on an indication sent from the second RAT prior to the RRC reestablishment. For example, the second RAT may indicate that, in case the communication device 300 needs to change from LTE PDCP to NR PDCP, the communication device 300 shall use a particular LTE algorithm. For example, the second RAT can configure the communication device 300 to use NR algorithm X, but the second RAT would also indicate that if the communication device 300 needs to change to LTE PDCP the communication device shall apply LTE algorithm B.

Figure 10:
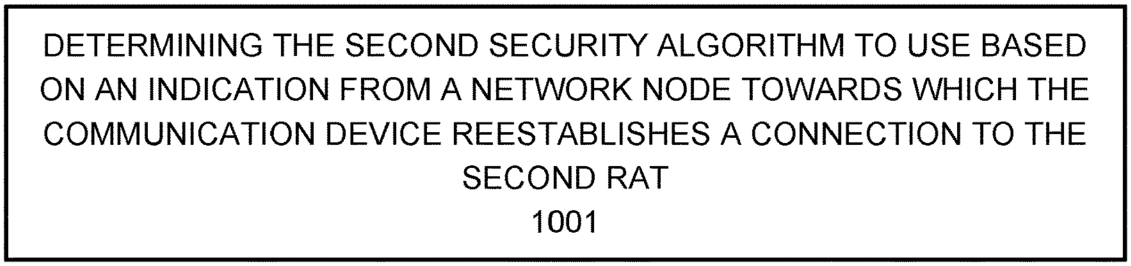

Turning to FIG. 10, in further embodiments, the processing circuitry 303 in block 1001 determines the second security algorithm to use by determining the second security algorithm based on an indication from a network node towards which the communication device reestablishes a connection to the second RAT. For example, the network node in the second RAT to which the communication device 300 reestablishes to, may indicate that the communication device 300 shall use a particular LTE algorithm in case the communication device reestablishes to the network node. This indication could be indicated to the communication device 300, for example, in system information.

Figure 11:
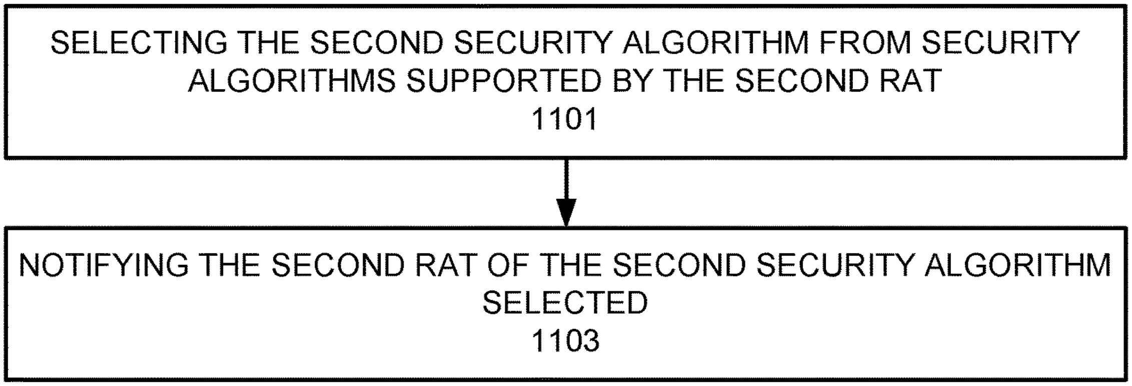

Turning to FIG. 11, in additional embodiments, the processing circuitry 303 determines the second security algorithm to use by selecting, in block 1101, the second security algorithm from security algorithms supported by the second RAT. The processing circuitry 303 notifies the second RAT of the second security algorithm selected in block 1103. The communication device 300 may use a new RRC message or an existing one (e.g. the communication device 300 may add this info directly in the RRC reestablishment request message). Further, if a new message is used on an existing one that is not the RRC reestablishment request message, the communication device 300 may send this information to the network before or after the RRC reestablishment request message.

Figure 12:
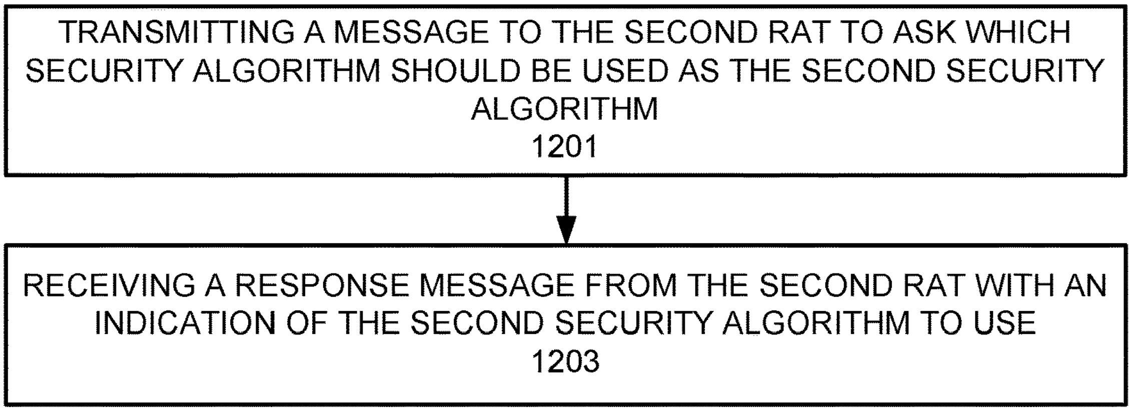

Turning to FIG. 12, the processing circuitry 303 determines the second security algorithm to use by transmitting, in block 1201, a message to the second RAT to ask which security algorithm should be used as the second security algorithm. In block 1203, the processing circuitry 303 receives a response message from the second RAT with an indication of the second security algorithm to use. For example, the communication device 300 sends a new or an existing RRC message (e.g., UE assistance information) to the network in order to ask which LTE algorithm should be used. When receiving the request, the second RAT may either send a dedicated RRC message to the communication device 300 with the security algorithm to use, or the second RAT can broadcast the algorithm to use in system information.

Figure 13:
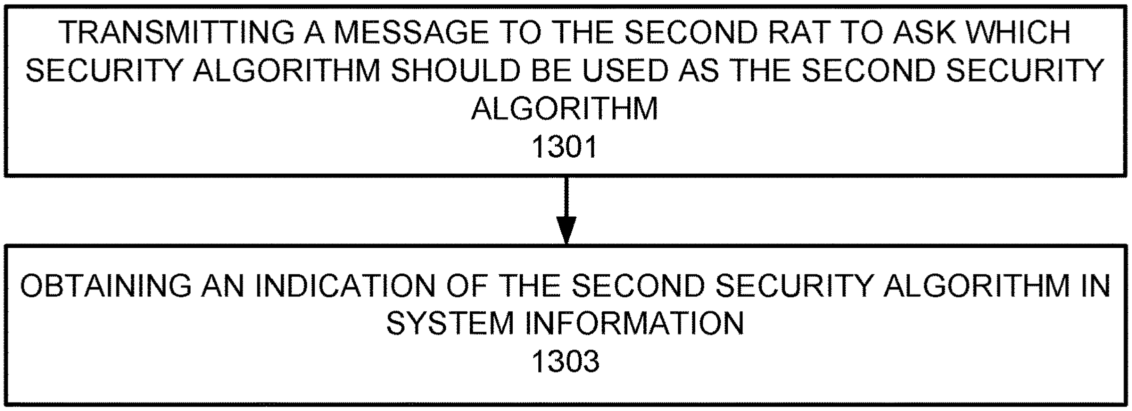

Turning to FIG. 13, in still other embodiments, the processing circuitry 303 determines the second security algorithm to use by transmitting, in block 1301, a message to the second RAT to ask which security algorithm should be used as the second security algorithm. The processing circuitry 303 obtains an indication of the second security algorithm in system information.

Figure 14:
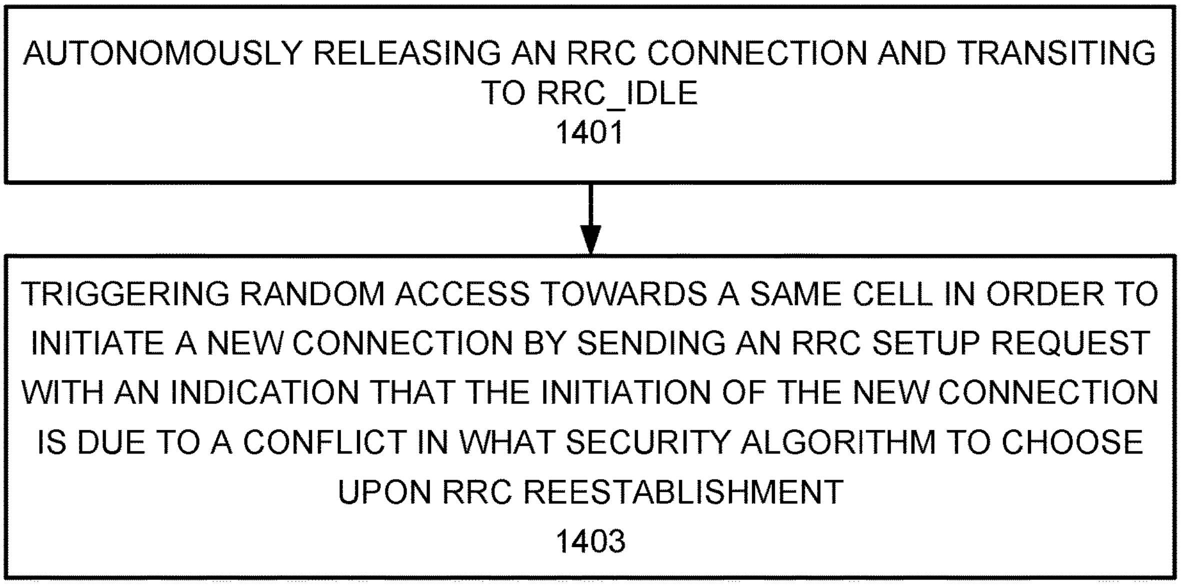

Turning to FIG. 14, in additional embodiments, the processing circuitry 303 determines the second security algorithm to use by autonomously releasing, in block 1401, an RRC connection and transiting to RRC_IDLE. In block 1403, the processing circuitry 303 triggers random access towards a same cell in order to initiate a new connection by sending an RRC setup request with an indication that the initiation of the new connection is due to a conflict in what security algorithm to choose upon RRC reestablishment.

Figure 15:
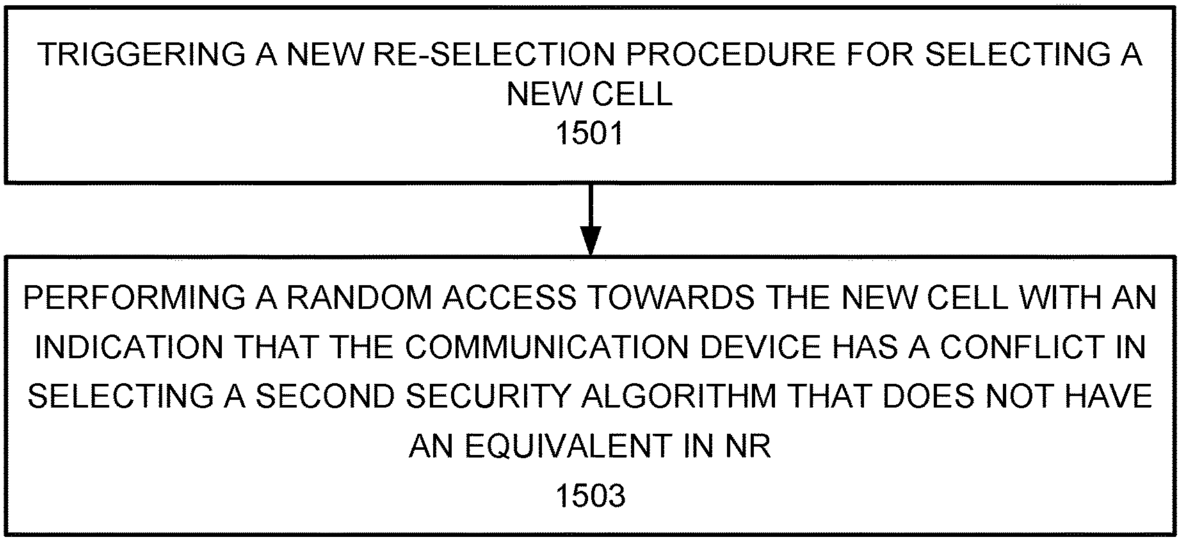

Turning to FIG. 15, the processing circuitry 303 determines the second security algorithm to use by triggering, in block 1501, a new re-selection procedure for selecting a new cell. In block 1503, the processing circuitry 303 performs a random access towards the new cell with an indication that the communication device has a conflict in selecting a second security algorithm that does not have an equivalent in NR.

Figure 16:
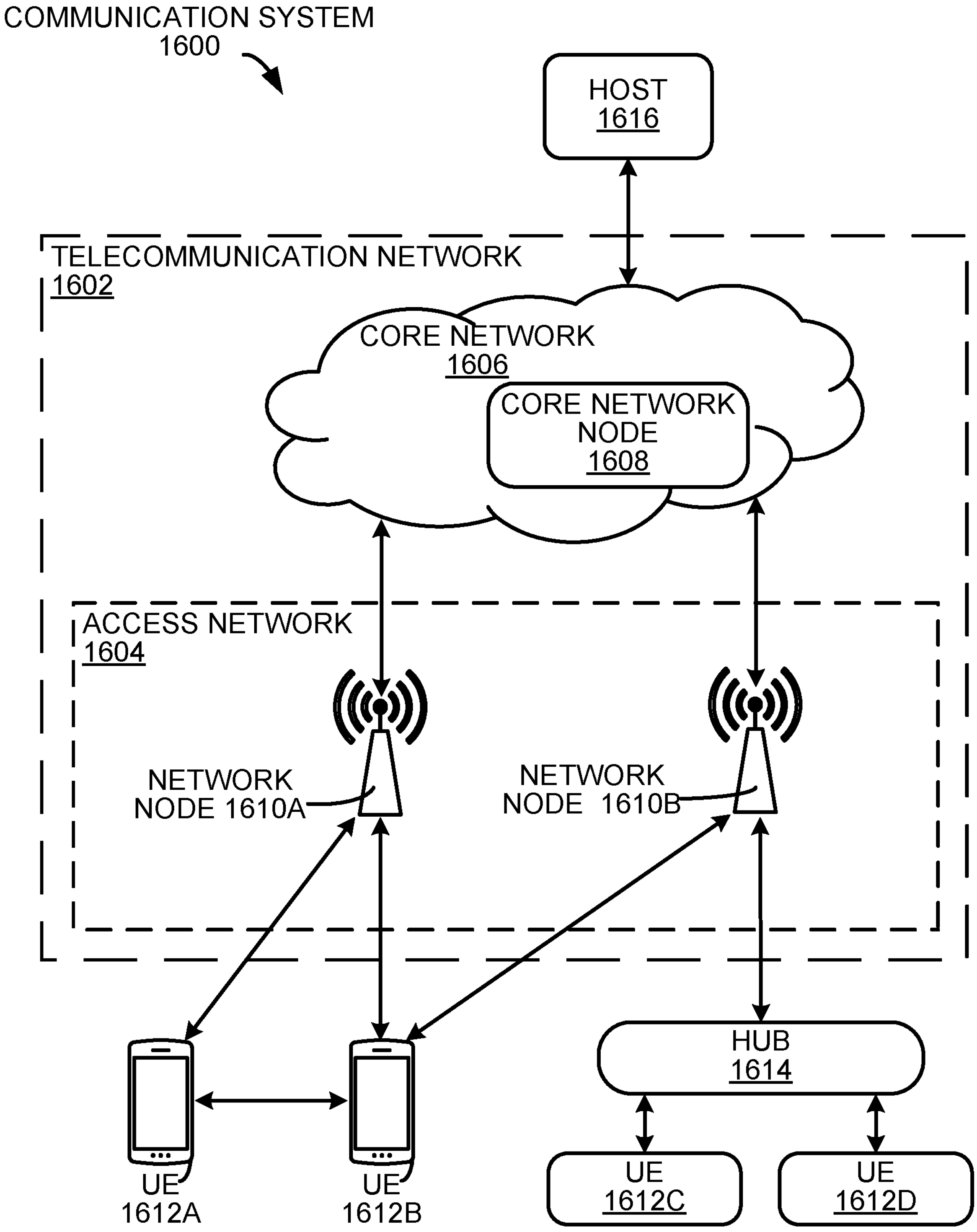
FIG. 16 is a block diagram of a communication system in accordance with some embodiments.

FIG. 16 shows an example of a communication system 1600 in accordance with some embodiments.

In the example, the communication system 1600 includes a telecommunication network 1602 that includes an access network 1604, such as a radio access network (RAN), and a core network 1606, which includes one or more core network nodes 1608. The access network 1604 includes one or more access network nodes, such as network nodes 1610*a* and 1610*b* (one or more of which may be generally referred to as network nodes 1610), or any other similar 3$^{rd}$ Generation Partnership Project (3GPP) access node or non-3GPP access point. The network nodes 1610 facilitate direct or indirect connection of user equipment (UE), such as by connecting UEs 1612*a*, 1612*b*, 1612*c*, and 1612*d* (one or more of which may be generally referred to as UEs 1612) to the core network 1606 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1600 may include any number of wired or wireless networks, network nodes, UEs, and/or any other components or systems that may facilitate or participate in the communication of data and/or signals whether via wired or wireless connections. The communication system 1600 may include and/or interface with any type of communication, telecommunication, data, cellular, radio network, and/or other similar type of system.

The UEs 1612 may be any of a wide variety of communication devices, including wireless devices arranged, configured, and/or operable to communicate wirelessly with the network nodes 1610 and other communication devices. Similarly, the network nodes 1610 are arranged, capable, configured, and/or operable to communicate directly or indirectly with the UEs 1612 and/or with other network nodes or equipment in the telecommunication network 1602 to enable and/or provide network access, such as wireless network access, and/or to perform other functions, such as administration in the telecommunication network 1602.

In the depicted example, the core network 1606 connects the network nodes 1610 to one or more hosts, such as host 1616. These connections may be direct or indirect via one or more intermediary networks or devices. In other examples, network nodes may be directly coupled to hosts. The core network 1606 includes one more core network nodes (e.g., core network node 1608) that are structured with hardware and software components. Features of these components may be substantially similar to those described with respect to the UEs, network nodes, and/or hosts, such that the descriptions thereof are generally applicable to the corresponding components of the core network node 1608. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1616 may be under the ownership or control of a service provider other than an operator or provider of the access network 1604 and/or the telecommunication network 1602, and may be operated by the service provider or on behalf of the service provider. The host 1616 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1600 of FIG. 16 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1602 is a cellular network that implements 3GPP standardized features. Accordingly, the telecommunications network 1602 may support network slicing to provide different logical networks to different devices that are connected to the telecommunication network 1602. For example, the telecommunications network 1602 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1612 are configured to transmit and/or receive information without direct human interaction. For instance, a UE may be designed to transmit information to the access network 1604 on a predetermined schedule, when triggered by an internal or external event, or in response to requests from the access network 1604. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1614 communicates with the access network 1604 to facilitate indirect communication between one or more UEs (e.g., UE 1612*c* and/or 1612*d*) and network nodes (e.g., network node 1610*b*). In some examples, the hub 1614 may be a controller, router, content source and analytics, or any of the other communication devices described herein regarding UEs. For example, the hub 1614 may be a broadband router enabling access to the core network 1606 for the UEs. As another example, the hub 1614 may be a controller that sends commands or instructions to one or more actuators in the UEs. Commands or instructions may be received from the UEs, network nodes 1610, or by executable code, script, process, or other instructions in the hub 1614. As another example, the hub 1614 may be a data collector that acts as temporary storage for UE data and, in some embodiments, may perform analysis or other processing of the data. As another example, the hub 1614 may be a content source. For example, for a UE that is a VR headset, display, loudspeaker or other media delivery device, the hub 1614 may retrieve VR assets, video, audio, or other media or data related to sensory information via a network node, which the hub 1614 then provides to the UE either directly, after performing local processing, and/or after adding additional local content. In still another example, the hub 1614 acts as a proxy server or orchestrator for the UEs, in particular in if one or more of the UEs are low energy IoT devices.

The hub 1614 may have a constant/persistent or intermittent connection to the network node 1610*b*. The hub 1614 may also allow for a different communication scheme and/or schedule between the hub 1614 and UEs (e.g., UE 1612*c* and/or 1612*d*), and between the hub 1614 and the core network 1606. In other examples, the hub 1614 is connected to the core network 1606 and/or one or more UEs via a wired connection. Moreover, the hub 1614 may be configured to connect to an M2M service provider over the access network 1604 and/or to another UE over a direct connection. In some scenarios, UEs may establish a wireless connection with the network nodes 1610 while still connected via the hub 1614 via a wired or wireless connection. In some embodiments, the hub 1614 may be a dedicated hub—that is, a hub whose primary function is to route communications to/from the UEs from/to the network node 1610*b*. In other embodiments, the hub 1614 may be a non-dedicated hub—that is, a device which is capable of operating to route communications between the UEs and network node 1610*b*, but which is additionally capable of operating as a communication start and/or end point for certain data channels.

Figure 17:
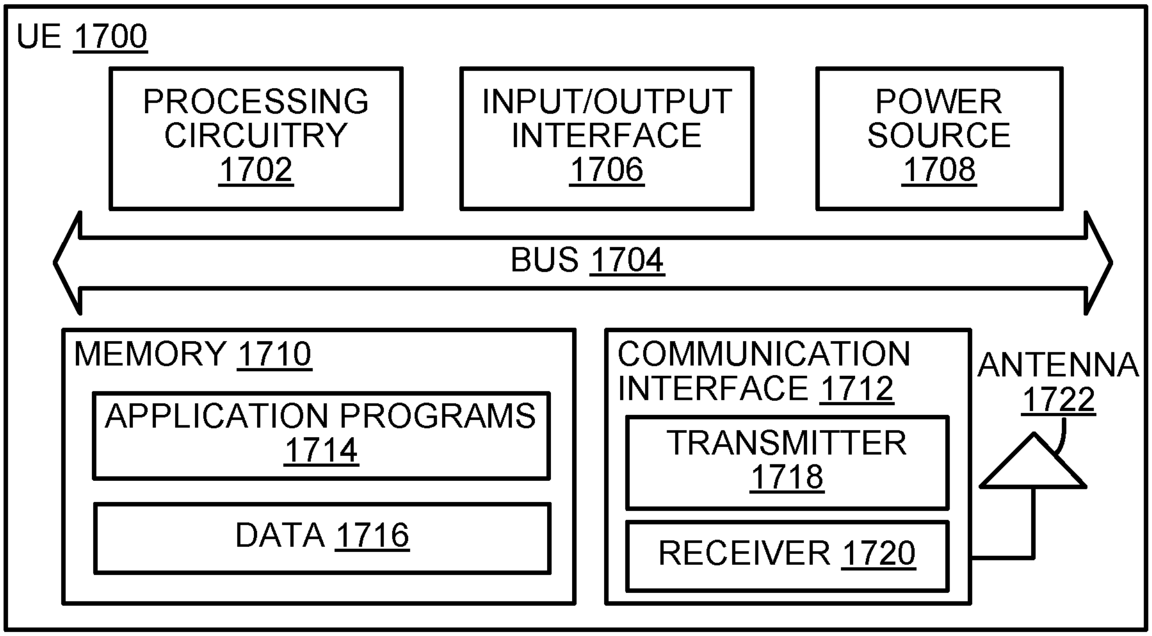
FIG. 17 is a block diagram of a user equipment in accordance with some embodiments

FIG. 17 shows a UE 1700 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (voice over internet protocol (VoIP)) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1700 includes processing circuitry 1702 that is operatively coupled via a bus 1704 to an input/output interface 1706, a power source 1708, a memory 1710, a communication interface 1712, and/or any other component, or any combination thereof. Certain UEs may utilize all or a subset of the components shown in FIG. 17. The level of integration between the components may vary from one UE to another UE. Further, certain UEs may contain multiple instances of a component, such as multiple processors, memories, transceivers, transmitters, receivers, etc.

The processing circuitry 1702 is configured to process instructions and data and may be configured to implement any sequential state machine operative to execute instructions stored as machine-readable computer programs in the memory 1710. The processing circuitry 1702 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1702 may include multiple central processing units (CPUs).

In the example, the input/output interface 1706 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1700. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1708 is structured as a battery or battery pack. Other types of power sources, such as an external power source (e.g., an electricity outlet), photovoltaic device, or power cell, may be used. The power source 1708 may further include power circuitry for delivering power from the power source 1708 itself, and/or an external power source, to the various parts of the UE 1700 via input circuitry or an interface such as an electrical power cable. Delivering power may be, for example, for charging of the power source 1708. Power circuitry may perform any formatting, converting, or other modification to the power from the power source 1708 to make the power suitable for the respective components of the UE 1700 to which power is supplied.

The memory 1710 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1710 includes one or more application programs 1714, such as an operating system, web browser application, a widget, gadget engine, or other application, and corresponding data 1716. The memory 1710 may store, for use by the UE 1700, any of a variety of various operating systems or combinations of operating systems.

The memory 1710 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1710 may allow the UE 1700 to access instructions, application programs and the like, stored on transitory or non-transitory memory media, to off-load data, or to upload data. An article of manufacture, such as one utilizing a communication system may be tangibly embodied as or in the memory 1710, which may be or comprise a device-readable storage medium.

The processing circuitry 1702 may be configured to communicate with an access network or other network using the communication interface 1712. The communication interface 1712 may comprise one or more communication subsystems and may include or be communicatively coupled to an antenna 1722. The communication interface 1712 may include one or more transceivers used to communicate, such as by communicating with one or more remote transceivers of another device capable of wireless communication (e.g., another UE or a network node in an access network). Each transceiver may include a transmitter 1718 and/or a receiver 1720 appropriate to provide network communications (e.g., optical, electrical, frequency allocations, and so forth). Moreover, the transmitter 1718 and receiver 1720 may be coupled to one or more antennas (e.g., antenna 1722) and may share circuit components, software or firmware, or alternatively be implemented separately.

In the illustrated embodiment, communication functions of the communication interface 1712 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1712, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1700 shown in FIG. 17.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 18:
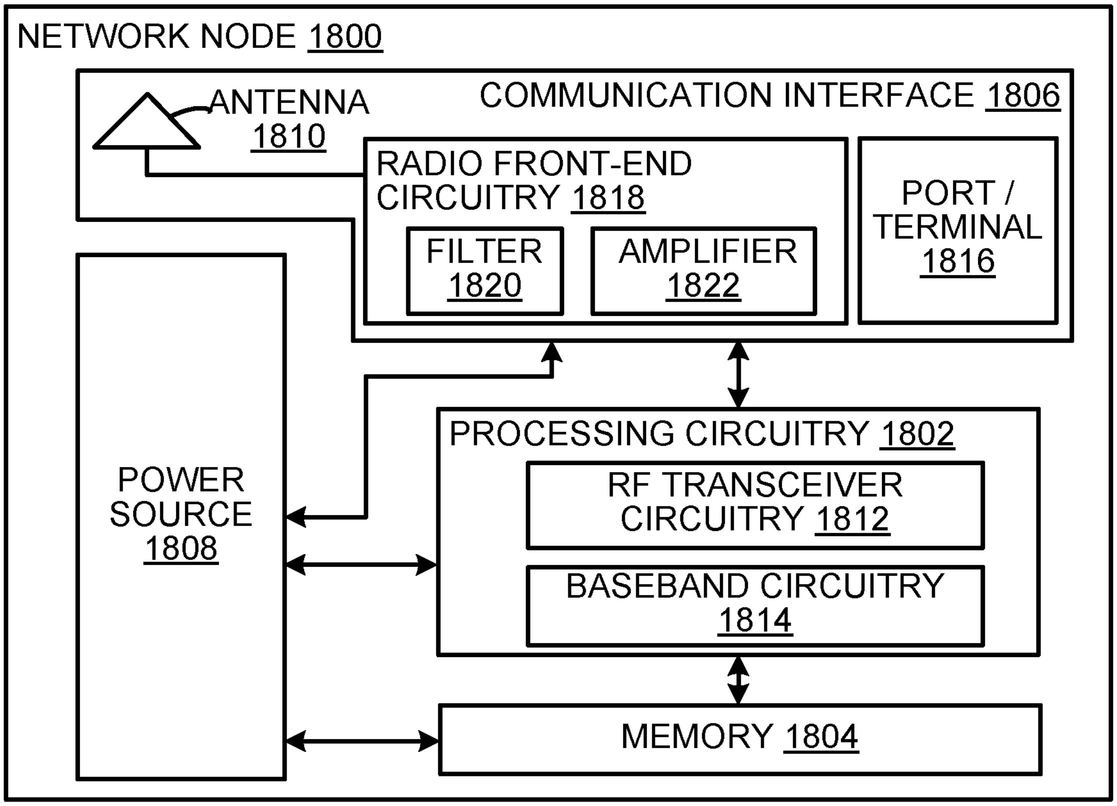
FIG. 18 is a block diagram of a network node in accordance with some embodiments.

FIG. 18 shows a network node 1800 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1800 includes a processing circuitry 1802, a memory 1804, a communication interface 1806, and a power source 1808. The network node 1800 may be composed of multiple physically separate components (e.g., a NodeB component and a RNC component, or a BTS component and a BSC component, etc.), which may each have their own respective components. In certain scenarios in which the network node 1800 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1800 may be configured to support multiple radio access technologies (RATs). In such embodiments, some components may be duplicated (e.g., separate memory 1804 for different RATs) and some components may be reused (e.g., a same antenna 1810 may be shared by different RATs). The network node 1800 may also include multiple sets of the various illustrated components for different wireless technologies integrated into network node 1800, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1800.

The processing circuitry 1802 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1800 components, such as the memory 1804, to provide network node 1800 functionality.

In some embodiments, the processing circuitry 1802 includes a system on a chip (SOC). In some embodiments, the processing circuitry 1802 includes one or more of radio frequency (RF) transceiver circuitry 1812 and baseband processing circuitry 1814. In some embodiments, the radio frequency (RF) transceiver circuitry 1812 and the baseband processing circuitry 1814 may be on separate chips (or sets of chips), boards, or units, such as radio units and digital units. In alternative embodiments, part or all of RF transceiver circuitry 1812 and baseband processing circuitry 1814 may be on the same chip or set of chips, boards, or units.

The memory 1804 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1802. The memory 1804 may store any suitable instructions, data, or information, including a computer program, software, an application including one or more of logic, rules, code, tables, and/or other instructions capable of being executed by the processing circuitry 1802 and utilized by the network node 1800. The memory 1804 may be used to store any calculations made by the processing circuitry 1802 and/or any data received via the communication interface 1806. In some embodiments, the processing circuitry 1802 and memory 1804 is integrated.

The communication interface 1806 is used in wired or wireless communication of signaling and/or data between a network node, access network, and/or UE. As illustrated, the communication interface 1806 comprises port(s)/terminal(s) 1816 to send and receive data, for example to and from a network over a wired connection. The communication interface 1806 also includes radio front-end circuitry 1818 that may be coupled to, or in certain embodiments a part of, the antenna 1810. Radio front-end circuitry 1818 comprises filters 1820 and amplifiers 1822. The radio front-end circuitry 1818 may be connected to an antenna 1810 and processing circuitry 1802. The radio front-end circuitry may be configured to condition signals communicated between antenna 1810 and processing circuitry 1802. The radio front-end circuitry 1818 may receive digital data that is to be sent out to other network nodes or UEs via a wireless connection. The radio front-end circuitry 1818 may convert the digital data into a radio signal having the appropriate channel and bandwidth parameters using a combination of filters 1820 and/or amplifiers 1822. The radio signal may then be transmitted via the antenna 1810. Similarly, when receiving data, the antenna 1810 may collect radio signals which are then converted into digital data by the radio front-end circuitry 1818. The digital data may be passed to the processing circuitry 1802. In other embodiments, the communication interface may comprise different components and/or different combinations of components.

In certain alternative embodiments, the network node 1800 does not include separate radio front-end circuitry 1818, instead, the processing circuitry 1802 includes radio front-end circuitry and is connected to the antenna 1810. Similarly, in some embodiments, all or some of the RF transceiver circuitry 1812 is part of the communication interface 1806. In still other embodiments, the communication interface 1806 includes one or more ports or terminals 1816, the radio front-end circuitry 1818, and the RF transceiver circuitry 1812, as part of a radio unit (not shown), and the communication interface 1806 communicates with the baseband processing circuitry 1814, which is part of a digital unit (not shown).

The antenna 1810 may include one or more antennas, or antenna arrays, configured to send and/or receive wireless signals. The antenna 1810 may be coupled to the radio front-end circuitry 1818 and may be any type of antenna capable of transmitting and receiving data and/or signals wirelessly. In certain embodiments, the antenna 1810 is separate from the network node 1800 and connectable to the network node 1800 through an interface or port.

The antenna 1810, communication interface 1806, and/or the processing circuitry 1802 may be configured to perform any receiving operations and/or certain obtaining operations described herein as being performed by the network node. Any information, data and/or signals may be received from a UE, another network node and/or any other network equipment. Similarly, the antenna 1810, the communication interface 1806, and/or the processing circuitry 1802 may be configured to perform any transmitting operations described herein as being performed by the network node. Any information, data and/or signals may be transmitted to a UE, another network node and/or any other network equipment.

The power source 1808 provides power to the various components of network node 1800 in a form suitable for the respective components (e.g., at a voltage and current level needed for each respective component). The power source 1808 may further comprise, or be coupled to, power management circuitry to supply the components of the network node 1800 with power for performing the functionality described herein. For example, the network node 1800 may be connectable to an external power source (e.g., the power grid, an electricity outlet) via an input circuitry or interface such as an electrical cable, whereby the external power source supplies power to power circuitry of the power source 1808. As a further example, the power source 1808 may comprise a source of power in the form of a battery or battery pack which is connected to, or integrated in, power circuitry. The battery may provide backup power should the external power source fail.

Embodiments of the network node 1800 may include additional components beyond those shown in FIG. 18 for providing certain aspects of the network node's functionality, including any of the functionality described herein and/or any functionality necessary to support the subject matter described herein. For example, the network node 1800 may include user interface equipment to allow input of information into the network node 1800 and to allow output of information from the network node 1800. This may allow a user to perform diagnostic, maintenance, repair, and other administrative functions for the network node 1800.

Figure 19:
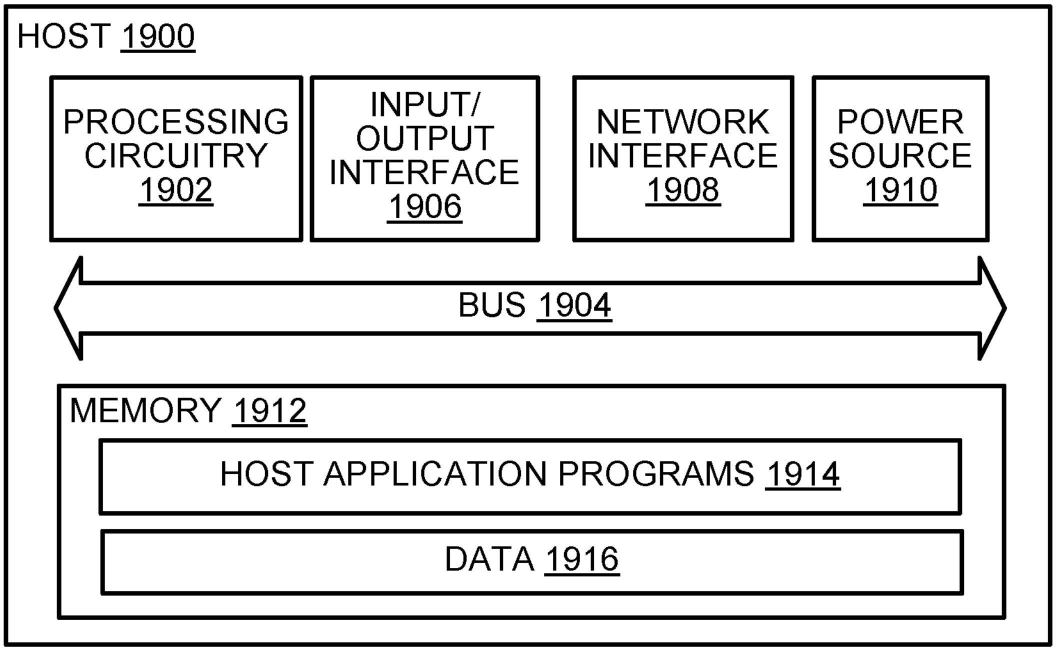
FIG. 19 is a block diagram of a host computer communicating with a user equipment in accordance with some embodiments.

FIG. 19 is a block diagram of a host 1900, which may be an embodiment of the host 1616 of FIG. 16, in accordance with various aspects described herein. As used herein, the host 1900 may be or comprise various combinations hardware and/or software, including a standalone server, a blade server, a cloud-implemented server, a distributed server, a virtual machine, container, or processing resources in a server farm. The host 1900 may provide one or more services to one or more UEs.

The host 1900 includes processing circuitry 1902 that is operatively coupled via a bus 1904 to an input/output interface 1906, a network interface 1908, a power source 1910, and a memory 1912. Other components may be included in other embodiments. Features of these components may be substantially similar to those described with respect to the devices of previous figures, such as FIGS. 17 and 18, such that the descriptions thereof are generally applicable to the corresponding components of host 1900.

The memory 1912 may include one or more computer programs including one or more host application programs 1914 and data 1916, which may include user data, e.g., data generated by a UE for the host 1900 or data generated by the host 1900 for a UE. Embodiments of the host 1900 may utilize only a subset or all of the components shown. The host application programs 1914 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1914 may also provide for user authentication and licensing checks and may periodically report health, routes, and content availability to a central node, such as a device in or on the edge of a core network. Accordingly, the host 1900 may select and/or indicate a different host for over-the-top services for a UE. The host application programs 1914 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 20:
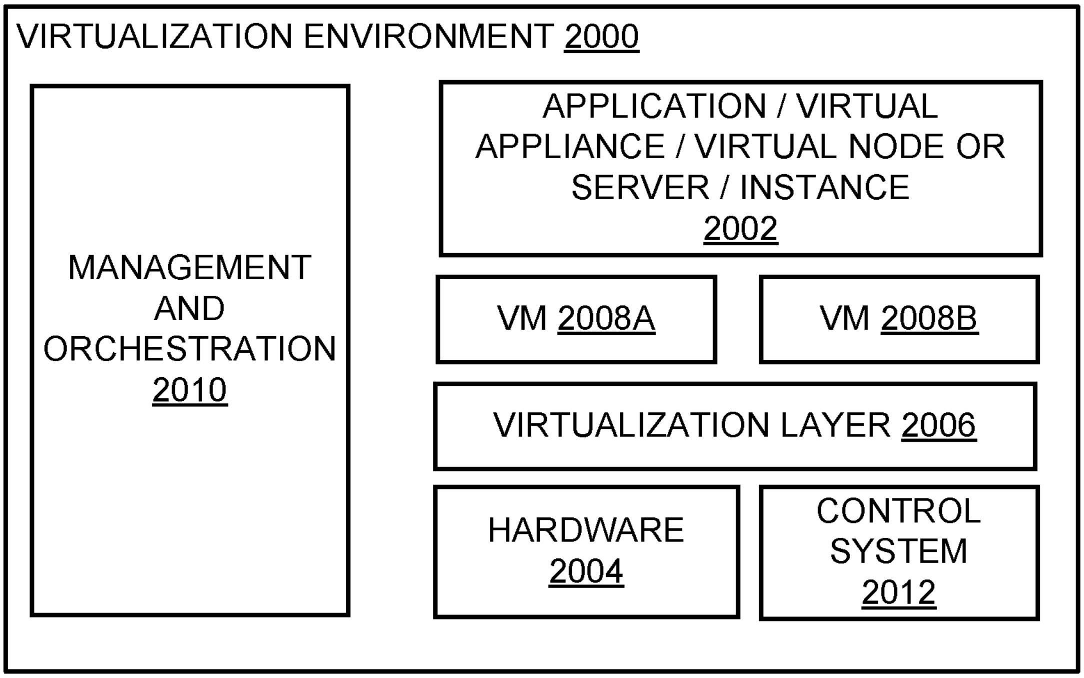
FIG. 20 is a block diagram of a virtualization environment in accordance with some embodiments.

FIG. 20 is a block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2000 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2002 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 2004 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 2006 (also referred to as hypervisors or virtual machine monitors (VMMs)), provide VMs 2008*a* and 2008*b* (one or more of which may be generally referred to as VMs 2008), and/or perform any of the functions, features and/or benefits described in relation with some embodiments described herein. The virtualization layer 2006 may present a virtual operating platform that appears like networking hardware to the VMs 2008.

The VMs 2008 comprise virtual processing, virtual memory, virtual networking or interface and virtual storage, and may be run by a corresponding virtualization layer 2006. Different embodiments of the instance of a virtual appliance 2002 may be implemented on one or more of VMs 2008, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2008 may be a software implementation of a physical machine that runs programs as if they were executing on a physical, non-virtualized machine. Each of the VMs 2008, and that part of hardware 2004 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2008 on top of the hardware 2004 and corresponds to the application 2002.

Hardware 2004 may be implemented in a standalone network node with generic or specific components. Hardware 2004 may implement some functions via virtualization. Alternatively, hardware 2004 may be part of a larger cluster of hardware (e.g. such as in a data center or CPE) where many hardware nodes work together and are managed via management and orchestration 2010, which, among others, oversees lifecycle management of applications 2002. In some embodiments, hardware 2004 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2012 which may alternatively be used for communication between hardware nodes and radio units.

Figure 21:
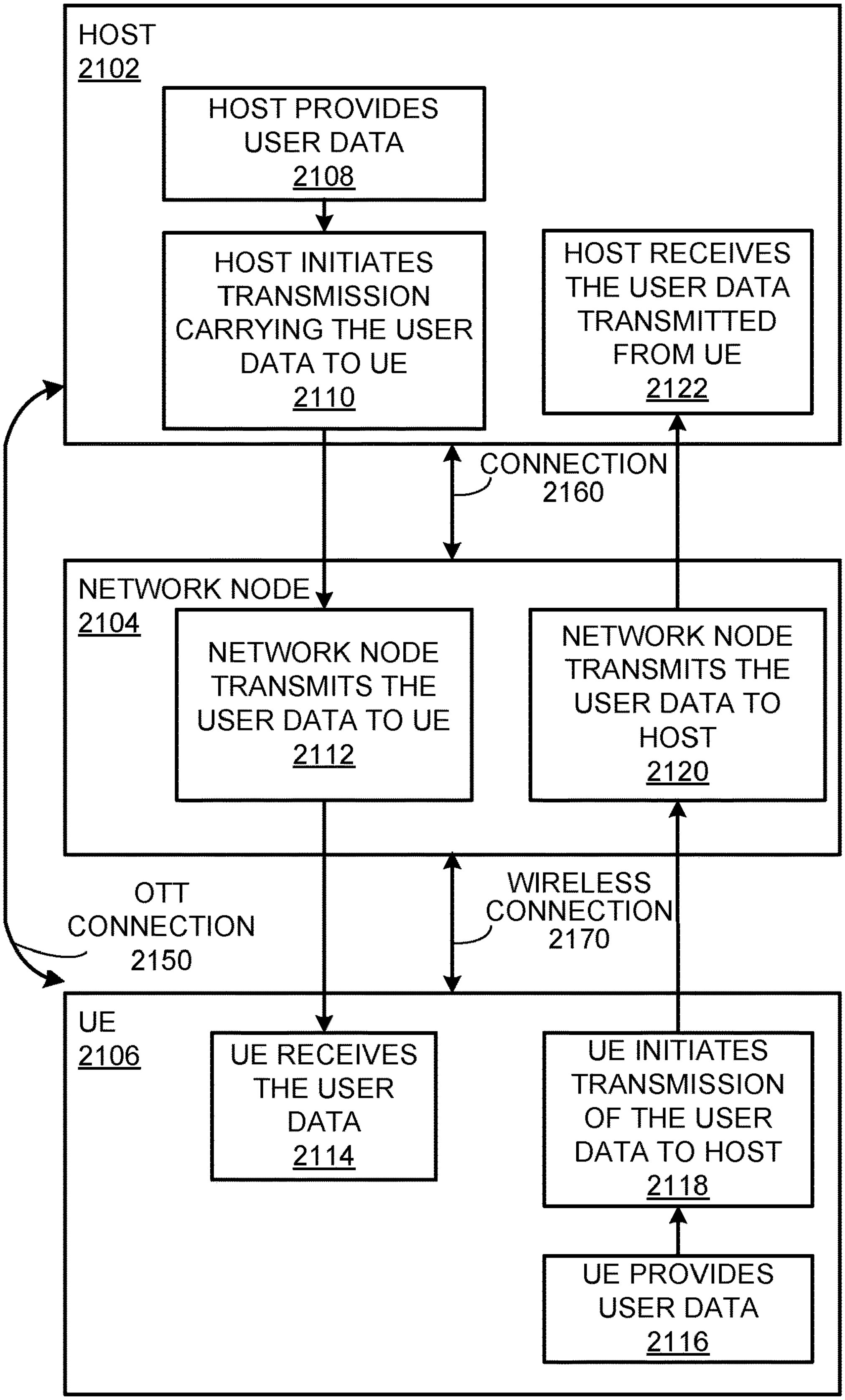
FIG. 21 is a block diagram of a host computer communicating via a base station with a user equipment over a partially wireless connection in accordance with some embodiments in accordance with some embodiments.

FIG. 21 shows a communication diagram of a host 2102 communicating via a network node 2104 with a UE 2106 over a partially wireless connection in accordance with some embodiments. Example implementations, in accordance with various embodiments, of the UE (such as a UE 1612*a* of FIG. 16 and/or UE 1700 of FIG. 17), network node (such as network node 1610*a* of FIG. 16 and/or network node 1800 of FIG. 18), and host (such as host 1616 of FIG. 16 and/or host 1900 of FIG. 19) discussed in the preceding paragraphs will now be described with reference to FIG. 21.

Like host 1900, embodiments of host 2102 include hardware, such as a communication interface, processing circuitry, and memory. The host 2102 also includes software, which is stored in or accessible by the host 2102 and executable by the processing circuitry. The software includes a host application that may be operable to provide a service to a remote user, such as the UE 2106 connecting via an over-the-top (OTT) connection 2150 extending between the UE 2106 and host 2102. In providing the service to the remote user, a host application may provide user data which is transmitted using the OTT connection 2150.

The network node 2104 includes hardware enabling it to communicate with the host 2102 and UE 2106. The connection 2160 may be direct or pass through a core network (like core network 1606 of FIG. 16) and/or one or more other intermediate networks, such as one or more public, private, or hosted networks. For example, an intermediate network may be a backbone network or the Internet.

The UE 2106 includes hardware and software, which is stored in or accessible by UE 2106 and executable by the UE's processing circuitry. The software includes a client application, such as a web browser or operator-specific "app" that may be operable to provide a service to a human or non-human user via UE 2106 with the support of the host 2102. In the host 2102, an executing host application may communicate with the executing client application via the OTT connection 2150 terminating at the UE 2106 and host 2102. In providing the service to the user, the UE's client application may receive request data from the host's host application and provide user data in response to the request data. The OTT connection 2150 may transfer both the request data and the user data. The UE's client application may interact with the user to generate the user data that it provides to the host application through the OTT connection 2150.

The OTT connection 2150 may extend via a connection 2160 between the host 2102 and the network node 2104 and via a wireless connection 2170 between the network node 2104 and the UE 2106 to provide the connection between the host 2102 and the UE 2106. The connection 2160 and wireless connection 2170, over which the OTT connection 2150 may be provided, have been drawn abstractly to illustrate the communication between the host 2102 and the UE 2106 via the network node 2104, without explicit reference to any intermediary devices and the precise routing of messages via these devices.

As an example of transmitting data via the OTT connection 2150, in step 2108, the host 2102 provides user data, which may be performed by executing a host application. In some embodiments, the user data is associated with a particular human user interacting with the UE 2106. In other embodiments, the user data is associated with a UE 2106 that shares data with the host 2102 without explicit human interaction. In step 2110, the host 2102 initiates a transmission carrying the user data towards the UE 2106. The host 2102 may initiate the transmission responsive to a request transmitted by the UE 2106. The request may be caused by human interaction with the UE 2106 or by operation of the client application executing on the UE 2106. The transmission may pass via the network node 2104, in accordance with the teachings of the embodiments described throughout this disclosure. Accordingly, in step 2112, the network node 2104 transmits to the UE 2106 the user data that was carried in the transmission that the host 2102 initiated, in accordance with the teachings of the embodiments described throughout this disclosure. In step 2114, the UE 2106 receives the user data carried in the transmission, which may be performed by a client application executed on the UE 2106 associated with the host application executed by the host 2102.

In some examples, the UE 2106 executes a client application which provides user data to the host 2102. The user data may be provided in reaction or response to the data received from the host 2102. Accordingly, in step 2116, the UE 2106 may provide user data, which may be performed by executing the client application. In providing the user data, the client application may further consider user input received from the user via an input/output interface of the UE 2106. Regardless of the specific manner in which the user data was provided, the UE 2106 initiates, in step 2118, transmission of the user data towards the host 2102 via the network node 2104. In step 2120, in accordance with the teachings of the embodiments described throughout this disclosure, the network node 2104 receives user data from the UE 2106 and initiates transmission of the received user data towards the host 2102. In step 2122, the host 2102 receives the user data carried in the transmission initiated by the UE 2106.

In an example scenario, factory status information may be collected and analyzed by the host 2102. As another example, the host 2102 may process audio and video data which may have been retrieved from a UE for use in creating maps. As another example, the host 2102 may collect and analyze real-time data to assist in controlling vehicle congestion (e.g., controlling traffic lights). As another example, the host 2102 may store surveillance video uploaded by a UE. As another example, the host 2102 may store or control access to media content such as video, audio, VR or AR which it can broadcast, multicast or unicast to UEs. As other examples, the host 2102 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2150 between the host 2102 and UE 2106, in response to variations in the measurement results. The measurement procedure and/or the network functionality for reconfiguring the OTT connection may be implemented in software and hardware of the host 2102 and/or UE 2106. In some embodiments, sensors (not shown) may be deployed in or in association with other devices through which the OTT connection 2150 passes; the sensors may participate in the measurement procedure by supplying values of the monitored quantities exemplified above, or supplying values of other physical quantities from which software may compute or estimate the monitored quantities. The reconfiguring of the OTT connection 2150 may include message format, retransmission settings, preferred routing etc.; the reconfiguring need not directly alter the operation of the network node 2104. Such procedures and functionalities may be known and practiced in the art. In certain embodiments, measurements may involve proprietary UE signaling that facilitates measurements of throughput, propagation times, latency and the like, by the host 2102. The measurements may be implemented in that software causes messages to be transmitted, in particular empty or 'dummy' messages, using the OTT connection 2150 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Embodiments

1. A method performed by a communication device configured with a packet data convergence protocol, PDCP, security algorithm associated with a first radio access technology, RAT, the method comprising:
   responsive to the communication device being configured with a first PDCP security algorithm in the first RAT that does not have an equivalent security algorithm in a second RAT, determining (601) a second security algorithm to use when performing radio resource control, RRC, reestablishment with the second RAT; and
   using (603) the second security algorithm when performing RRC reestablishment with the second RAT.
2. The method of Embodiment 1, wherein the first RAT and the second RAT are in a same network or are in different networks.
3. The method of any of Embodiments 1-2 wherein the first RAT is a new radio, NR, RAT and the second RAT is a long-term evolution, LTE, RAT.
4. The method of any of Embodiments 1-3, wherein determining the second security algorithm to use comprises determining (701) a default security algorithm to use.
5. The method of Embodiment 4, wherein determining the default security algorithm to use comprises receiving (703) the default security algorithm in a first setup of the RRC reestablishment connection.
6. The method of any of Embodiments 4-5, wherein determining the default security algorithm to use comprises determining (705) a mandatory security algorithm that is mandatory to be supported.
7. The method of any of Embodiments 4-5, wherein determining the default security algorithm to use comprises determining (705) a null algorithm to use.
8. The method of any of Embodiments 1-3, wherein determining the second security algorithm to use comprises determining (801) the second security algorithm to use based on a rule.
9. The method of any of Embodiments 1-3, wherein determining the second security algorithm to use comprises determining (901) the second security algorithm based on an indication sent from the second RAT prior to the RRC reestablishment.
10. The method of any of Embodiments 1-3, wherein determining the second security algorithm to use comprises determining (1001) the second security algorithm based on an indication from a RAT node towards which the communication device reestablishes a connection to the second RAT.
11. The method of Embodiment 10 wherein determining the second security algorithm based on the indication comprises obtaining the indication from system information.
12. The method of any of Embodiments 1-3, wherein determining the second security algorithm to use comprises:
    selecting (1101) the second security algorithm from security algorithms supported by the second RAT; and
    notifying (1103) the second RAT of the second security algorithm selected.
13. The method of any of Embodiments 1-3, wherein determining the second security algorithm to use comprises:
    transmitting (1201) a message to the second RAT to ask which security algorithm should be used as the second security algorithm; and
    receiving (1203) a response message from the second RAT with an indication of the second security algorithm to use.
14. The method of any of Embodiments 1-3, wherein determining the second security algorithm to use comprises:

transmitting (1301) a message to the second RATk to ask which security algorithm should be used as the second security algorithm; and obtaining (1303) an indication of the second security algorithm in system information.

15. The method of any of Embodiments 1-3, wherein determining the second security algorithm to use comprises:

autonomously releasing (1401) an RRC connection and transiting to RRC_IDLE; and triggering (1403) random access towards a same cell in order to initiate a new connection by sending an RRC setup request with an indication that the initiation of the new connection is due to a conflict in what security algorithm to choose upon RRC reestablishment.

16. The method of any of Embodiments 1-3, wherein determining the second security algorithm to use comprises:

triggering (1501) a new re-selection procedure for selecting a new cell; and performing (1503) a random access towards the new cell with an indication that the communication device has a conflict in selecting a second security algorithm that does not have an equivalent in NR.

17. A communication device, configured with a packet data convergence protocol, PDCP, security algorithm associated with a first radio access technology, RATk, the communication device adapted to:

responsive to the communication device being configured with a first PDCP security algorithm in the first RAT that does not have an equivalent security algorithm in a second RAT, determine (601) a second security algorithm to use when performing radio resource control, RRC, reestablishment with the second RAT; and use (603) the second security algorithm when performing RRC reestablishment with the second RAT.

18. The communication device of Embodiment 17, wherein the first RAT and the second RAT are in a same network or are in different networks.

19. The communication device of any of Embodiments 17-18, wherein the first RAT network is a New Radio, NR, RAT and the second RAT is a Long Term Evolution, LTE, RAT.

20. The communication device of any of Embodiments 17-19, wherein determining the second security algorithm to use comprises determining (701) a default security algorithm to use.

21. The communication device of Embodiment 20, wherein determining the default security algorithm to use comprises receiving (703) the default security algorithm in a first setup of the RRC reestablishment connection.

22. The communication device of any of Embodiments 20-21, wherein determining the default security algorithm to use comprises determining (705) a mandatory security algorithm that is mandatory to be supported.

23. The communication device of any of Embodiments 20-21, wherein determining the default security algorithm to use comprises determining (707) a null algorithm to use.

24. The communication device of any of Embodiments 17-19, wherein determining the second security algorithm to use comprises determining (801) a second security algorithm to use based on a rule.

25. The communication device of any of Embodiments 17-19, wherein determining the second security algorithm to use comprises determining (901) the second security algorithm based on an indication sent from the second RAT prior to the RRC reestablishment.

26. The communication device of any of Embodiments 17-19, wherein determining the second security algorithm to use comprises determining (1001) the second security algorithm based on an indication from a network node towards which the communication device reestablishes a connection to the second RAT.

27. The communication device of Embodiment 24 wherein determining the second security algorithm based on the indication comprises obtaining the indication from system information.

28. The communication device of any of Embodiments 17-19, wherein determining the second security algorithm to use comprises:

selecting (1101) the second security algorithm from security algorithms supported by the second RAT; and notifying (1103) the second RAT of the second security algorithm selected.

29. The communication device of any of Embodiments 17-19, wherein determining the second security algorithm to use comprises:

transmitting (1201) a message to the second RAT to ask which security algorithm should be used as the second security algorithm; and receiving (1203) a response message from the second RAT with an indication of the second security algorithm to use.

30. The communication device of any of Embodiments 17-19, wherein determining the second security algorithm to use comprises:

transmitting (1301) a message to the second RAT to ask which security algorithm should be used as the second security algorithm; and obtaining (1303) an indication of the second security algorithm in system information.

31. The communication device of any of Embodiments 17-19, wherein determining the second security algorithm to use comprises:

autonomously releasing (1401) an RRC connection and transit to RRC_IDLE; and triggering (1403) random access towards a same cell in order to initiate a new connection by sending an RRC setup request with an indication that the initiation of the new connection is due to a conflict in what security algorithm to choose upon RRC reestablishment.

32. The communication device of any of Embodiments 17-19, wherein determining the second security algorithm to use comprises:

triggering (1501) a new re-selection procedure for selecting a new cell; and performing (1503) a random access towards the new cell with an indication that the communication device has a conflict in selecting a second security algorithm that does not have an equivalent in NR.

33. A communication device (300, 1612A, 1612B, 1612C, 1612D, 1700, 2004, 2008A, 2008B, 2106) comprising:

processing circuitry (303, 1702, 2012); and memory (305, 1710) coupled with the processing circuitry, wherein the memory includes instructions that when executed by the processing circuitry causes the communication device to perform operations according to any of Embodiments 1-16.

34. A computer program comprising program code to be executed by processing circuitry (303, 1702, 2012) of a communication device (300, 1612A, 1612B, 1612C, 1612D, 1700, 2004, 2008A, 2008B, 2106), whereby execution of the program code causes the communication device (300, 1612A, 1612B, 1612C, 1612D, 1700, 2004, 2008A, 2008B, 2106) to perform operations according to any of Embodiments 1-16.

35. A computer program product comprising a non-transitory storage medium including program code to be executed by processing circuitry (303, 1702, 2012) of a communication device (300, 1612A, 1612B, 1612C, 1612D, 1700, 2004, 2008A, 2008B, 2106), whereby execution of the program code causes the communication device (300, 1612A, 1612B, 1612C, 1612D, 1700, 2004, 2008A, 2008B, 2106) to perform operations according to any of Embodiments 1-16.

References are identified below 1. 3GPP TS 36.331 v.16.5.0 (2021-06), 3rd Generation Partnership Project; Technical Specification Group Radio Access Network; Evolved Universal Terrestrial Radio Access (EUTRA); Radio Resource Control (RRC); Protocol specification (Release 16)

The invention claimed is:

1. A method performed by a communication device configured with a packet data convergence protocol (PDCP) security algorithm associated with a first radio access technology (RAT), the method comprising:

responsive to the communication device being configured with a first PDCP security algorithm in the first RAT that does not have an equivalent security algorithm in a second RAT, determining a second security algorithm to use when performing radio resource control (RRC) reestablishment with the second RAT, wherein determining the second security algorithm to use comprises at least one of:

determining the second security algorithm based on an indication from a RAT node towards which the communication device reestablishes a connection to the second RAT, wherein determining the second security algorithm based on the indication comprises obtaining the indication from system information;

deciding the second security algorithm to use by the communication device and notifying the choice to a network;

transmitting a message to the second RAT to ask which security algorithm should be used as the second security algorithm, and receiving a response message from the second RAT with an indication of the second security algorithm to use;

autonomously releasing an RRC connection and transiting to RRC_IDLE, and triggering random access towards a same cell in order to initiate a new connection by sending an RRC setup request with an indication that the initiation of the new connection is due to a conflict in what security algorithm to choose upon RRC reestablishment; and/or triggering a new re-selection procedure for selecting a new cell, and performing a random access towards the new cell with an indication that the communication device has a conflict in selecting a second security algorithm that does not have an equivalent in NR; and using the second security algorithm when performing RRC reestablishment with the second RAT.

2. The method of claim 1, wherein the first RAT and the second RAT are in a same network or are in different networks.

3. The method of claim 1, wherein the first RAT is a new radio (NR) RAT and the second RAT is a long-term evolution (LTE) RAT.

4. The method of claim 1, wherein determining the second security algorithm to use comprises determining a default security algorithm to use.

5. The method of claim 4, wherein determining the default security algorithm to use comprises at least one of:

receiving the default security algorithm in a first setup of the RRC reestablishment connection;

determining a mandatory security algorithm that is mandatory to be supported; and determining a null algorithm to use.

6. A communication device, configured with a packet data convergence protocol (PDCP) security algorithm associated with a first radio access technology (RAT), the communication device adapted to:

responsive to the communication device being configured with a first PDCP security algorithm in the first RAT that does not have an equivalent security algorithm in a second RAT, determine a second security algorithm to use when performing radio resource control (RRC) reestablishment with the second RAT, wherein determining the second security algorithm to use comprises at least one of:

determining the second security algorithm based on an indication from a RAT node towards which the communication device reestablishes a connection to the second RAT, wherein determining the second security algorithm based on the indication comprises obtaining the indication from system information;

deciding the second security algorithm to use by the communication device and notifying the choice to a network;

transmitting a message to the second RAT to ask which security algorithm should be used as the second security algorithm, and receiving a response message from the second RAT with an indication of the second security algorithm to use;

autonomously releasing an RRC connection and transiting to RRC_IDLE, and triggering random access towards a same cell in order to initiate a new connection by sending an RRC setup request with an indication that the initiation of the new connection is due to a conflict in what security algorithm to choose upon RRC reestablishment; and/or triggering a new re-selection procedure for selecting a new cell, and performing a random access towards the new cell with an indication that the communication device has a conflict in selecting a second security algorithm that does not have an equivalent in NR; and use the second security algorithm when performing RRC reestablishment with the second RAT.

7. The communication device of claim 6, wherein the first RAT and the second RAT are in a same network or are in different networks.

8. The communication device of claim 6, wherein the first RAT network is a New Radio (NR) RAT and the second RAT is a Long Term Evolution (LTE) RAT.

9. The communication device of claim 6, wherein determining the second security algorithm to use comprises determining a default security algorithm to use.

10. The communication device of claim 9, wherein determining the default security algorithm to use comprises one or more of:

receiving the default security algorithm in a first setup of the RRC reestablishment connection;

determining a mandatory security algorithm that is mandatory to be supported; and determining a null algorithm to use.

* * * * *